US009582287B2

(12) United States Patent
Shifer et al.

(10) Patent No.: US 9,582,287 B2
(45) Date of Patent: Feb. 28, 2017

(54) PROCESSOR HAVING MULTIPLE CORES, SHARED CORE EXTENSION LOGIC, AND SHARED CORE EXTENSION UTILIZATION INSTRUCTIONS

(71) Applicant: Intel Corporation, Santa Clara, CA (US)

(72) Inventors: Eran Shifer, Tel Aviv (IL); Mostafa Hagog, Kaukab (IL); Eliyahu Turiel, Shimshit (IL)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 13/629,460

(22) Filed: Sep. 27, 2012

(65) Prior Publication Data

US 2014/0089635 A1 Mar. 27, 2014

(51) Int. Cl.
*G06F 9/38* (2006.01)
*G06F 9/30* (2006.01)

(52) U.S. Cl.
CPC ........ *G06F 9/3887* (2013.01); *G06F 9/30076* (2013.01); *G06F 9/3879* (2013.01)

(58) Field of Classification Search
CPC combination set(s) only.
See application file for complete search history.

(56) References Cited

U.S. PATENT DOCUMENTS 5,530,881 A 6/1996 Inagami et al.
6,226,734 B1 * 5/2001 Kleinsorge ............ G06F 9/5077 712/13
8,006,074 B1 * 8/2011 Miranda ............. G06F 9/30181 712/225
8,161,482 B1 * 4/2012 Sakarda ................ G06F 9/5027 718/102
2005/0086352 A1 * 4/2005 Boisvert ............. G06F 9/30054 709/230
2007/0006200 A1 * 1/2007 Renno ................. G06F 9/30101 717/162

(Continued)

FOREIGN PATENT DOCUMENTS

CN 102067088 A 5/2011
JP 5-64862 A 3/1993

(Continued)

OTHER PUBLICATIONS

Dyer,M., etal., Partially Reconfigurable Cores for Xilinx Virtex, 2002, Springer-Verlag, pp. 292-301.*

(Continued)

*Primary Examiner* — Eric Coleman
(74) *Attorney, Agent, or Firm* — Vecchia Patent Agent, LLC

(57) ABSTRACT

An apparatus of an aspect includes a plurality of cores and shared core extension logic coupled with each of the plurality of cores. The shared core extension logic has shared data processing logic that is shared by each of the plurality of cores. Instruction execution logic, for each of the cores, in response to a shared core extension call instruction, is to call the shared core extension logic. The call is to have data processing performed by the shared data processing logic on behalf of a corresponding core. Other apparatus, methods, and systems are also disclosed.

30 Claims, 15 Drawing Sheets

(56) References Cited

U.S. PATENT DOCUMENTS

| | | | | |
|---|---|---|---|---|
| 2007/0271565 | A1* | 11/2007 | Tirumalai ................. | G06F 9/52 718/100 |
| 2008/0163183 | A1* | 7/2008 | Li ........................... | G06F 8/456 717/149 |
| 2010/0229181 | A1* | 9/2010 | Ahuja ................... | G06F 9/4856 718/107 |
| 2010/0332727 | A1* | 12/2010 | Kapil ...................... | G06F 12/08 711/103 |
| 2011/0113220 | A1 | 5/2011 | Morishita | |
| 2011/0119672 | A1* | 5/2011 | Ramaraju ............. | G06F 9/5044 718/102 |
| 2011/0246995 | A1 | 10/2011 | Fedorova et al. | |
| 2011/0249744 | A1* | 10/2011 | Bailey ................... | G06F 9/3891 375/240.16 |
| 2011/0258420 | A1* | 10/2011 | Devadas ............... | G06F 9/3824 712/225 |
| 2012/0147021 | A1 | 6/2012 | Cheng et al. | |
| 2012/0185678 | A1 | 7/2012 | Bruce et al. | |
| 2012/0192198 | A1 | 7/2012 | Becchi et al. | |
| 2013/0346732 | A1 | 12/2013 | Igura | |

FOREIGN PATENT DOCUMENTS

| | | | |
|---|---|---|---|
| JP | 05-197743 | A | 8/1993 |
| JP | 2002-073332 | A | 3/2002 |
| JP | 2002-278753 | A | 9/2002 |
| JP | 2004-234420 | A | 8/2004 |
| JP | 2007-156824 | A | 6/2007 |
| JP | 2008-097084 | A | 4/2008 |
| JP | 2008-530689 | A | 8/2008 |
| JP | 2011-034189 | A | 2/2011 |
| JP | 2011-148920 | A | 8/2011 |
| WO | 2009/153977 | A1 | 12/2009 |
| WO | PCT/US2012/031344 | | 3/2012 |
| WO | 2012/120573 | A1 | 9/2012 |
| WO | 2014/051736 | A1 | 4/2014 |

OTHER PUBLICATIONS

Beldianu, S.F.,etal., On-Chip Vector Coprocessor Sharing for Multicores, 2011, IEEE pp. 431-438.*

Pan, a. etal., Improving Yield and Reliability of Chip Multiprocessors, 2009, ACM, pp. 490-495.*

"Notification of Transmittal of the International Search Report and the Written Opinion of the International Searching Authority or the Declaration" date mailed Oct. 28, 2013 pp. 10, In PCT/US2013/04550.

International Preliminary Report on Patentability and Written Opinion Received for PCT Patent Application No. PCT/US2013/045501, mailed on Apr. 9, 2015, 7 pages.

Office Action received for Korean Patent Application No. 10-2015-7001680, mailed on Oct. 20, 2015, 7 pages of English Translation and 8 pages of Korean Office Action.

Office Action received for Chinese Patent Application No. 201380045297.7, mailed on Jul. 22, 2016, 21 pages of Chinese Office Action including 9 pages of English Translation.

Office Action received for Japanese Patent Application No. 2015-533047, mailed on May 17, 2016, 10 pages of English Translation and 12 pages of Japanese Office Action.

Notice of Allowance received for Korean Patent Application No. 10-2015-7001680, mailed on Aug. 30, 2016, 2 Pages.

Office Action received for Chinese Patent Application No. 201380045297.7, mailed on Jul. 22, 2016, 12 pages Chinese Office Action only.

* cited by examiner

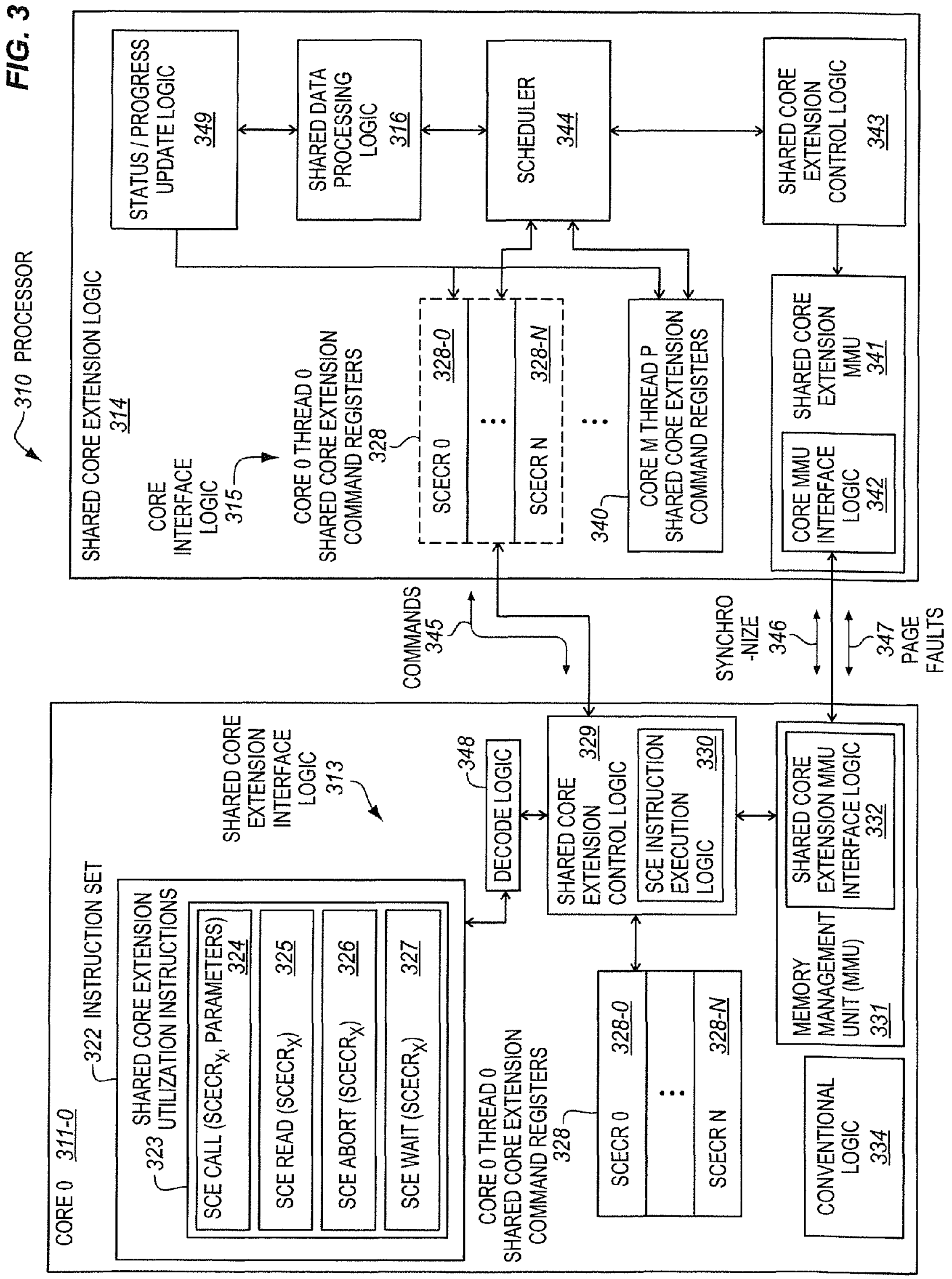
FIG. 3
310 PROCESSOR
SHARED CORE EXTENSION LOGIC 314
CORE INTERFACE LOGIC 315
STATUS / PROGRESS UPDATE LOGIC 349
SHARED DATA PROCESSING LOGIC 316
SCHEDULER 344
SHARED CORE EXTENSION CONTROL LOGIC 343
CORE 0 THREAD 0 SHARED CORE EXTENSION COMMAND REGISTERS 328
SCECR 0 328-0
SCECR N 328-N
340
CORE M THREAD P SHARED CORE EXTENSION COMMAND REGISTERS
SHARED CORE EXTENSION MMU 341
CORE MMU INTERFACE LOGIC 342
COMMANDS 345
SYNCHRO -NIZE 346
347 PAGE FAULTS
CORE 0 311-0
322 INSTRUCTION SET
323 SHARED CORE EXTENSION UTILIZATION INSTRUCTIONS
SCE CALL (SCECR$_X$, PARAMETERS) 324
SCE READ (SCECR$_X$) 325
SCE ABORT (SCECR$_X$) 326
SCE WAIT (SCECR$_X$) 327
SHARED CORE EXTENSION INTERFACE LOGIC 313
348 DECODE LOGIC
SHARED CORE EXTENSION CONTROL LOGIC 329
SCE INSTRUCTION EXECUTION LOGIC 330
CORE 0 THREAD 0 SHARED CORE EXTENSION COMMAND REGISTERS 328
SCECR 0 328-0
SCECR N 328-N
MEMORY MANAGEMENT UNIT (MMU) 331
SHARED CORE EXTENSION MMU INTERFACE LOGIC 332
CONVENTIONAL LOGIC 334

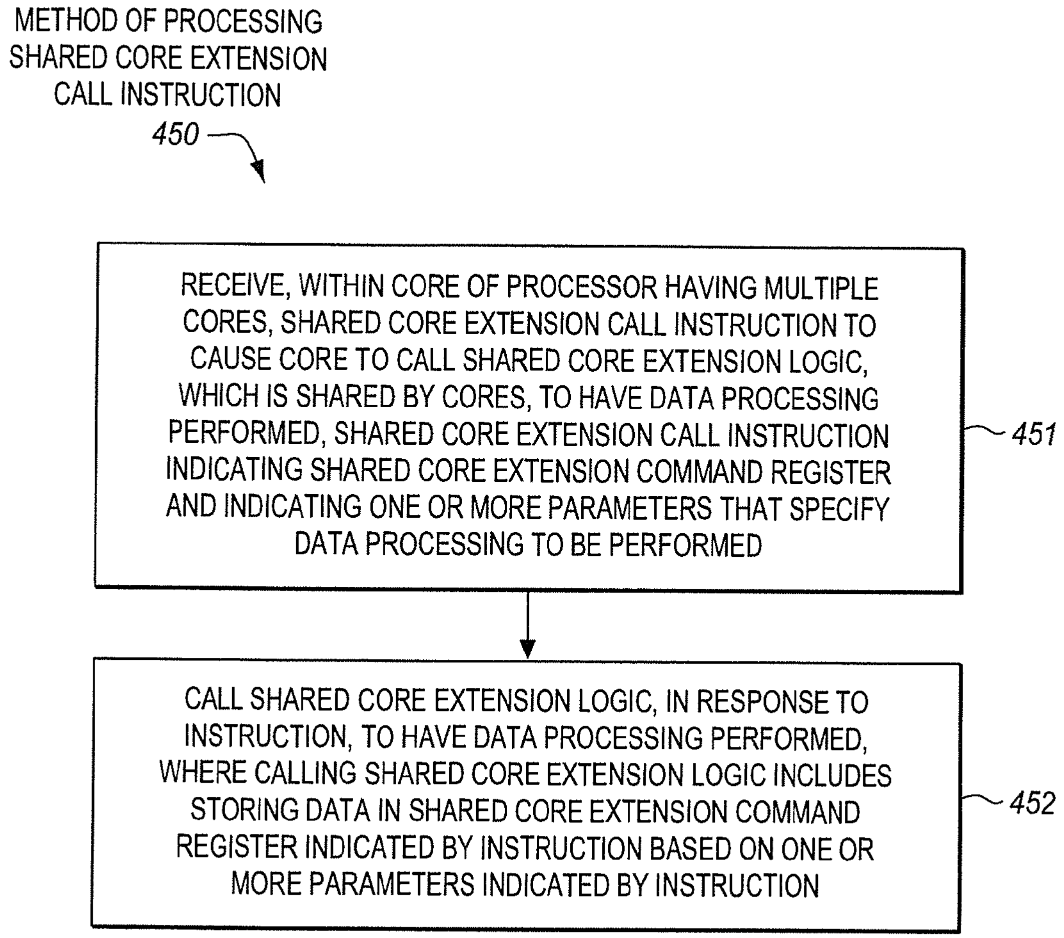

FIG. 4

METHOD OF PROCESSING
SHARED CORE EXTENSION
CALL INSTRUCTION
450

RECEIVE, WITHIN CORE OF PROCESSOR HAVING MULTIPLE CORES, SHARED CORE EXTENSION CALL INSTRUCTION TO CAUSE CORE TO CALL SHARED CORE EXTENSION LOGIC, WHICH IS SHARED BY CORES, TO HAVE DATA PROCESSING PERFORMED, SHARED CORE EXTENSION CALL INSTRUCTION INDICATING SHARED CORE EXTENSION COMMAND REGISTER AND INDICATING ONE OR MORE PARAMETERS THAT SPECIFY DATA PROCESSING TO BE PERFORMED — 451

CALL SHARED CORE EXTENSION LOGIC, IN RESPONSE TO INSTRUCTION, TO HAVE DATA PROCESSING PERFORMED, WHERE CALLING SHARED CORE EXTENSION LOGIC INCLUDES STORING DATA IN SHARED CORE EXTENSION COMMAND REGISTER INDICATED BY INSTRUCTION BASED ON ONE OR MORE PARAMETERS INDICATED BY INSTRUCTION — 452

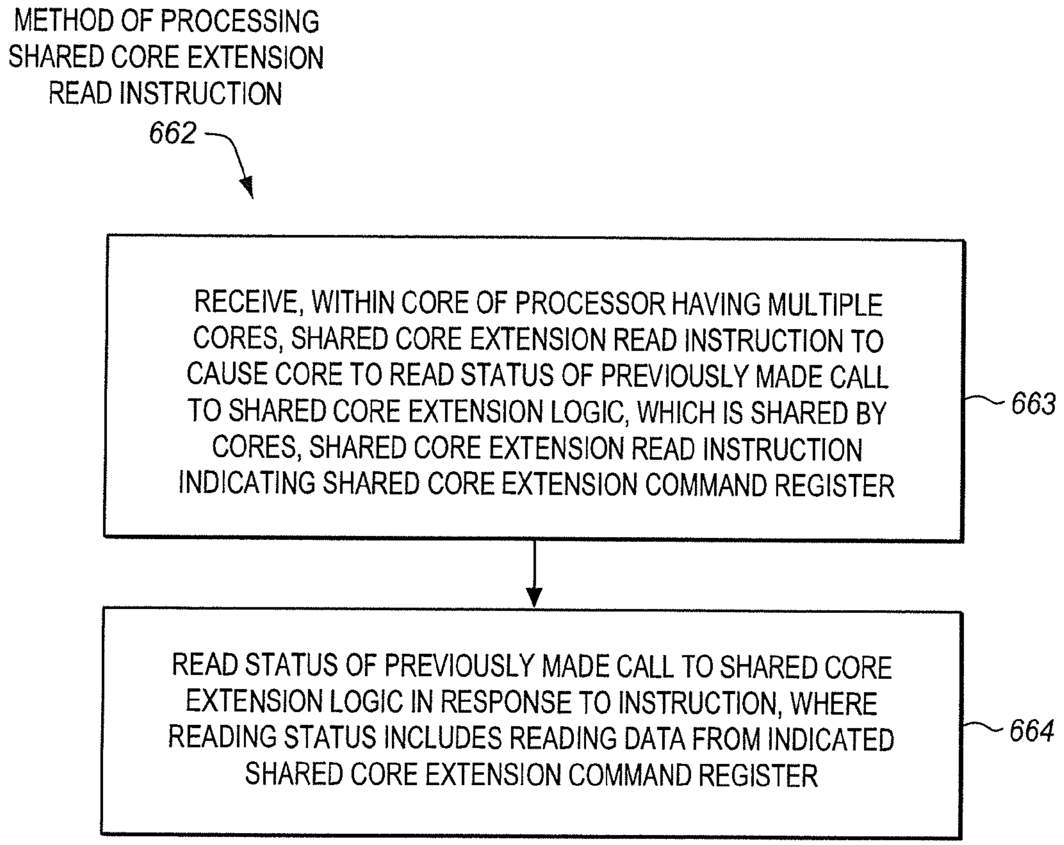

FIG. 6

METHOD OF PROCESSING
SHARED CORE EXTENSION
READ INSTRUCTION
662

RECEIVE, WITHIN CORE OF PROCESSOR HAVING MULTIPLE CORES, SHARED CORE EXTENSION READ INSTRUCTION TO CAUSE CORE TO READ STATUS OF PREVIOUSLY MADE CALL TO SHARED CORE EXTENSION LOGIC, WHICH IS SHARED BY CORES, SHARED CORE EXTENSION READ INSTRUCTION INDICATING SHARED CORE EXTENSION COMMAND REGISTER — 663

READ STATUS OF PREVIOUSLY MADE CALL TO SHARED CORE EXTENSION LOGIC IN RESPONSE TO INSTRUCTION, WHERE READING STATUS INCLUDES READING DATA FROM INDICATED SHARED CORE EXTENSION COMMAND REGISTER — 664

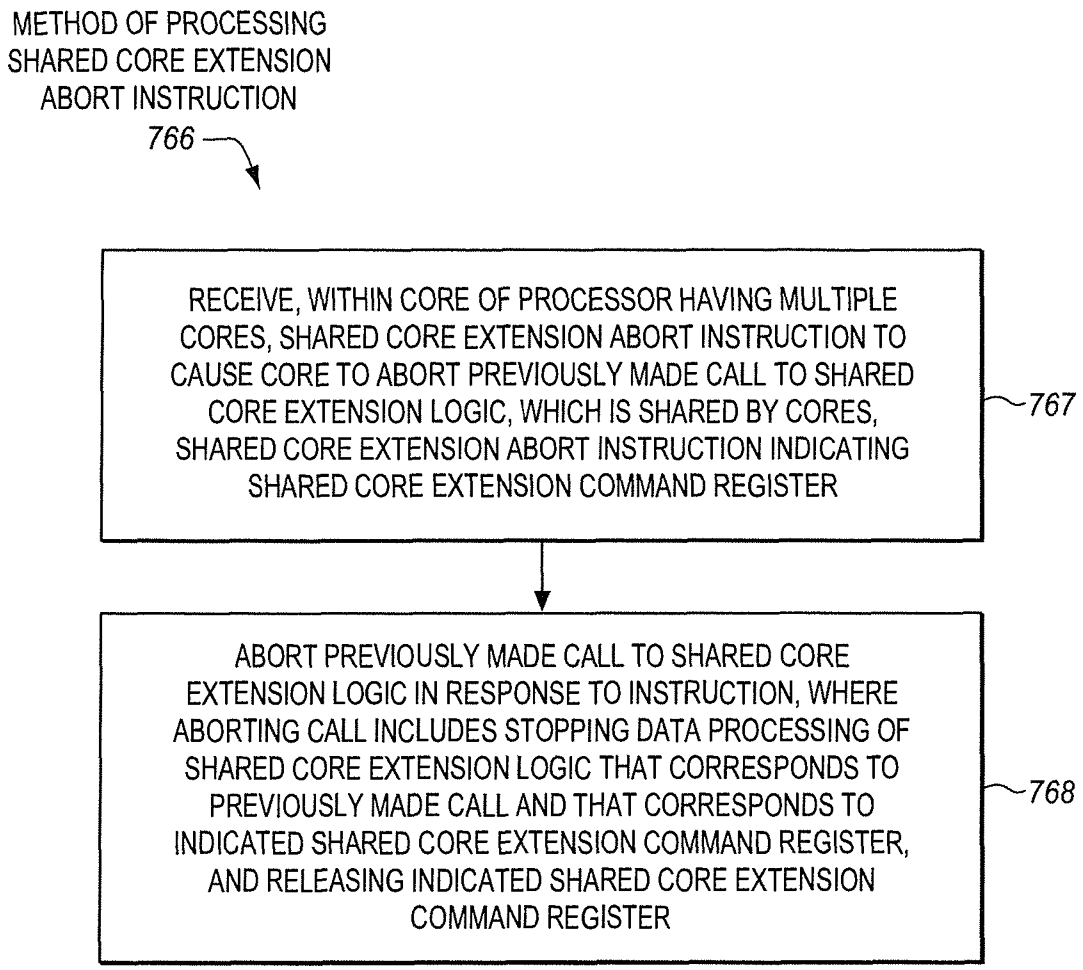

FIG. 7

METHOD OF PROCESSING
SHARED CORE EXTENSION
ABORT INSTRUCTION
766

RECEIVE, WITHIN CORE OF PROCESSOR HAVING MULTIPLE CORES, SHARED CORE EXTENSION ABORT INSTRUCTION TO CAUSE CORE TO ABORT PREVIOUSLY MADE CALL TO SHARED CORE EXTENSION LOGIC, WHICH IS SHARED BY CORES, SHARED CORE EXTENSION ABORT INSTRUCTION INDICATING SHARED CORE EXTENSION COMMAND REGISTER — 767

ABORT PREVIOUSLY MADE CALL TO SHARED CORE EXTENSION LOGIC IN RESPONSE TO INSTRUCTION, WHERE ABORTING CALL INCLUDES STOPPING DATA PROCESSING OF SHARED CORE EXTENSION LOGIC THAT CORRESPONDS TO PREVIOUSLY MADE CALL AND THAT CORRESPONDS TO INDICATED SHARED CORE EXTENSION COMMAND REGISTER, AND RELEASING INDICATED SHARED CORE EXTENSION COMMAND REGISTER — 768

PROCESSOR HAVING MULTIPLE CORES, SHARED CORE EXTENSION LOGIC, AND SHARED CORE EXTENSION UTILIZATION INSTRUCTIONS

BACKGROUND

Field

Embodiments relate to processors. In particular, embodiments relate to processors having multiple cores.

Background Information

FIG. 1 is a block diagram of a prior art processor 100. The processor has multiple cores 101. In particular, the illustrated processor has a core 0 101-0, a core 1 101-1, through a core M 101-M. By way of example, there may be two, four, seven, ten, sixteen, or any other appropriate number of cores. Each of the cores includes corresponding Single Instruction Multiple Data (SIMD) execution logic 102. In particular, core 0 includes SIMD execution logic 102-0, core 1 includes SIMD execution logic 102-1, and core M includes SIMD execution logic 102-M. That is, the SIMD execution logic is replicated per-core. Each SIMD execution logic is operable to process SIMD, vector, or packed data operands. Each of the operands may have multiple smaller data elements, such as 8-bit, 16-bit, 32-bit, or 64-bit data elements, which are packed together in the operands and processed in parallel by the SIMD execution logic.

In some processors, each of the SIMD execution logic may represent a relatively large amount of logic. For example, this may be the case when each of the SIMD execution logic is to process wide SIMD operands. Some processors are able to process vector or packed data operands having relatively wide widths, such as, for example, 128-bit operands, 256-bit operands, 512-bit operands, 1024-bit operands, or the like. Commonly, the SIMD execution logic needed to process such wide operands tends to be relatively large, to consume a relatively large amount of die area, to increase the cost of manufacturing the processor, and to consume a relatively large amount of power during use. Replicating the relatively large SIMD execution logic per-core tends to exacerbate such problems. Moreover, in many applications or workload scenarios, the replicated SIMD execution logic per-core tends to be underutilized at least some of the time. If the number of cores continues to increase in the future, such problems may become even more significant.

Still further, in the prior art processor of FIG. 1, each of the cores also has conventional flow control logic. In particular, core 0 has flow control logic 103-0, core 1 has flow control logic 103-1, and core M has flow control logic 103-M. Commonly, the flow control logic may be designed or optimized to cover a wide range of usage models, for example, introducing speculative execution. However, this generally tends to have a relatively small benefit for SIMD and various other high throughput computations, but tends to be accompanied by relatively high power consumption.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 3 is a block diagram of an embodiment of a processor having a core 0 including an embodiment of shared core extension interface logic and having an embodiment of shared core extension logic including an embodiment of core interface logic.

FIG. 4 is a block flow diagram of an embodiment of a method of processing an embodiment of shared core extension call instruction.

FIG. 6 is a block flow diagram of an embodiment of a method of processing an embodiment of shared core extension read instruction.

FIG. 7 is a block flow diagram of an embodiment of a method of processing an embodiment of shared core extension abort instruction.

DETAILED DESCRIPTION

Disclosed herein are embodiments of processors having multiple cores and shared core extension logic that is shared by the multiple cores (e.g., is operable to perform data processing for each of the cores). Also disclosed herein are shared core extension utilization instructions, processors to execute the shared core extension utilization instructions, methods performed by the processors when processing or executing the shared core extension utilization instructions, and systems incorporating one or more processors to process or execute the shared core extension utilization instructions.

In the following description, numerous specific details are set forth, such as particular micro-architectural details, particular command register formats, particular shared core extension utilization instruction functionalities, particular groups of shared core extension utilization instructions, particular types and interrelationships of system components, and particular logic partitioning/integration details. However, it is understood that embodiments of the invention may be practiced without these specific details. In other instances, well-known circuits, structures and techniques have not been shown in detail in order not to obscure the understanding of this description.

Figure 2:
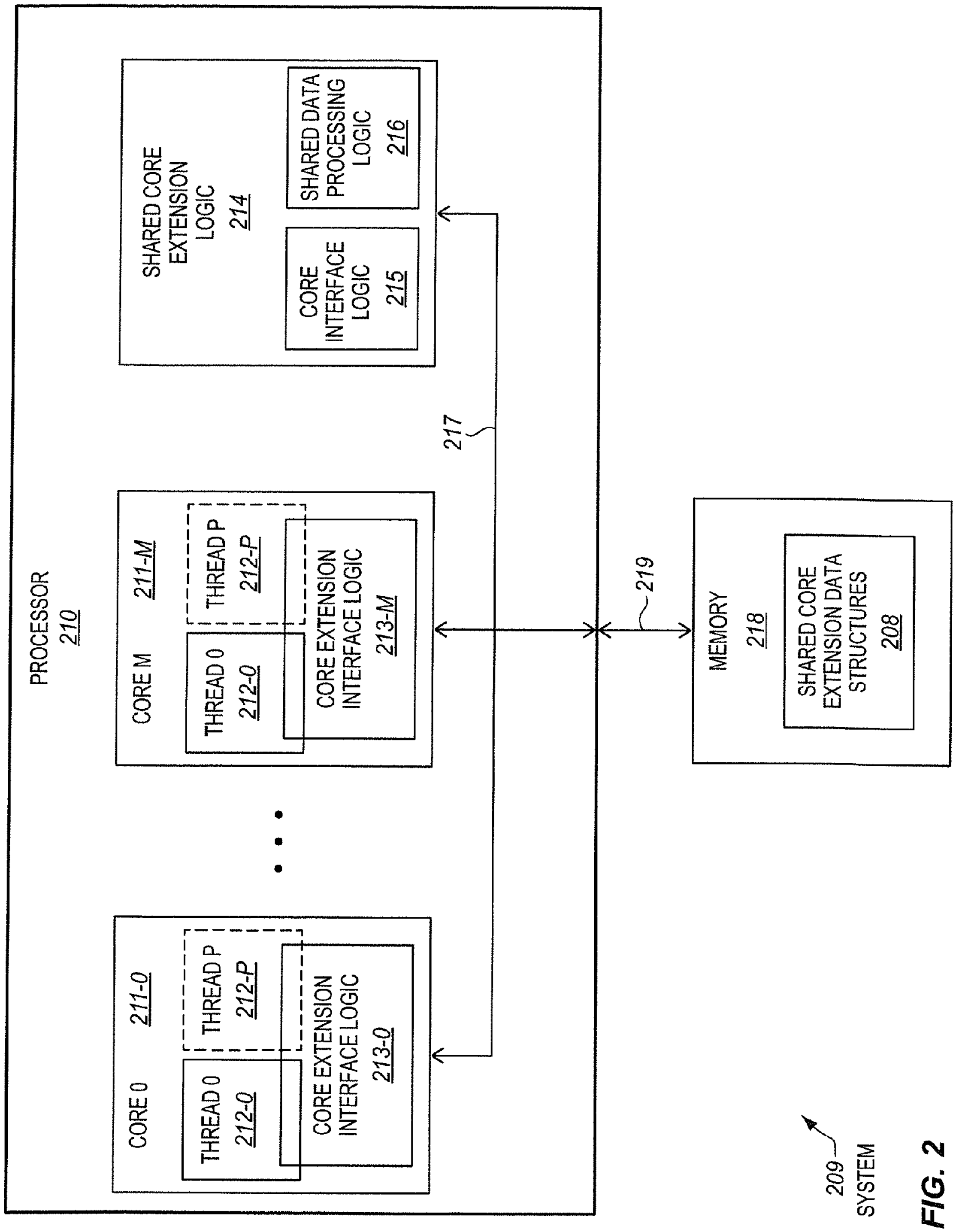
FIG. 2 is a block diagram of an embodiment of a system having an embodiment of a processor and an embodiment of a memory.

FIG. 2 is a block diagram of an embodiment of a system 209 having an embodiment of a processor 210 and an embodiment of a memory 218. The processor and the memory are coupled, or otherwise in communication with one another, through one or more buses or other interconnects 219. In various embodiments, the system 209 may represent a desktop computer system, a laptop computer system, a server computer system, a network element, a cellular phone, or another type of electronic device having a multi-core processor and a memory.

The processor 210 has multiple cores 211. The illustrated processor has a core 0 211-0 through a core M 211-M. By way of example, there may be two, four, seven, ten, sixteen, thirty-two, sixty-four, one hundred twenty eight, or more cores, or any other reasonably appropriate number of cores that is desired for the particular implementation. In some embodiments, each of the cores may be able to operate substantially independently of the other cores. Each of the cores is able to process at least one thread. As shown in the illustration, core 0 has a thread 0 212-0 and may optionally include up to a thread P 212-P. Similarly, core M has a thread 0 212-0 and may optionally include up to a thread P 212-P. The number of threads P may be any reasonably appropriate number of threads. The scope of the invention is not limited to any known number of cores or any known number of threads that those cores are able to process.

The processor may be any of various complex instruction set computing (CISC) processors, various reduced instruction set computing (RISC) processors, various very long instruction word (VLIW) processors, various hybrids thereof, or other types of processors entirely. In some embodiments, the cores may be general-purpose cores of a general-purpose processor of the type used in desktop, laptop, server, and like computer systems. In some embodiments, the cores may be special-purpose cores. Examples of suitable special-purpose cores include, but are not limited to, graphics processor cores, digital signal processor (DSP) cores, and network processor cores, to name just a few examples. In some embodiments, the processor may be a System-on-Chip (SoC) having multiple general-purpose or special-purpose cores and one or more of a graphics unit, a media block, system memory integrated on chip with the cores.

The processor also includes an embodiment of shared core extension logic 214. The shared core extension logic is shared by each of the cores 211 (e.g., is operable to perform data processing for each of the cores). The shared core extension logic includes shared data processing logic 216 that is operable to perform the data processing for each of the cores. The shared core extension logic and the cores are coupled with one another by one or more busses or other interconnects 217 of the processor. The cores and the shared core extension logic include corresponding interface logics 213, 215 to allow one or more physical threads on each of the cores and the shared core extension logic to interface or interact with one another (e.g., for the threads of the cores to call the shared core extension logic to have data processing performed, to check on the status of the data processing, to abort data processing, to synchronize virtual memory attributes on context switches, to route page faults occurring during the data processing, etc.). The computational tasks executed by the shared core extension logic on behalf of each physical thread may run under the logical process of that specific physical thread. As will be described further below, the context used for the interface may be provided per physical thread.

In particular, core 0 includes an embodiment of shared core extension interface logic 213-0 including at least some logic specific to thread 0 on core 0 and at least some logic specific to thread P on core 0. Likewise, core M includes an embodiment of shared core extension interface logic 213-M including at least some logic specific to thread 0 on core M and at least some logic specific to thread P on core M. Each of the other cores (if any) may similarly include such shared core extension interface logic. The shared core extension logic 214 includes an embodiment of corresponding core interface logic 215. Each core 211 may interface or interact, through its corresponding shared core extension interface logic 213, with the core interface logic 215 of the shared core extension logic 214. In some embodiments, the shared core extension interface logic 213, and the core interface logic 215, may provide an architectural interface (e.g., new architectural macroinstructions and new architectural registers), as well as a micro-architectural interface or hardware mechanism (e.g., data processing scheduling logic, memory management unit (MMU) synchronization logic, page fault routing logic, etc.), to allow the cores to share the shared core extension logic (e.g., share data processing by the shared data processing logic 216). Detailed example embodiments of the shared core extension interface logic 213 and the core interface logic 215 will be discussed further below.

Figure 1:
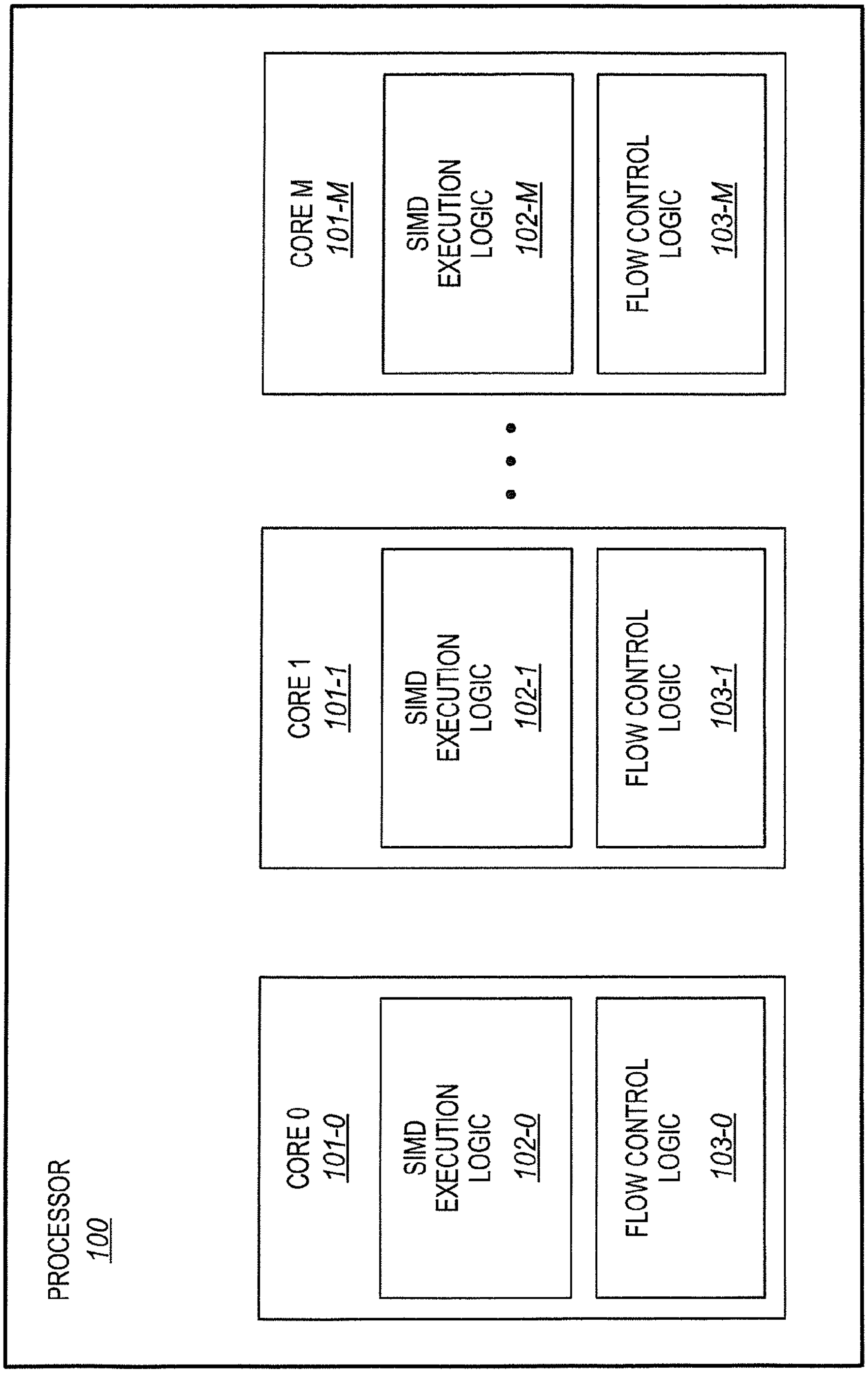
FIG. 1 is a block diagram of a prior art processor.

The shared data processing logic 216 may represent different types of data processing logic in various different embodiments. As previously discussed above in the background section, certain types of data processing logic (e.g., certain wide SIMD execution units) have conventionally been replicated per-core. As mentioned before, often this replicated logic tends to be relatively large. Moreover, often this replicated logic is underutilized, at least some of the time, for many common workload scenarios. The replication of such logic generally tends to consume a relatively large amount of die area, to increase the cost of manufacturing, and to consume a relatively large amount of power. In some embodiments, such relatively large and/or commonly underutilized data processing logic, which is conventionally replicated per core, may be extracted from the multiple cores into the shared core extension logic, as a single shared copy of the data processing logic. Moreover, the shared core extension logic 214 may employ flow control logic that is desired or optimized for high throughput as opposed to being designed or optimized to cover a wide range of usage models, for example, introducing speculative execution, as was the case for the conventional flow control logic of the cores of FIG. 1. This generally tends to provide a higher level of power-performance efficiency for throughput oriented algorithms.

In various embodiments, the shared data processing logic may represent throughput-oriented hardware computation function logic, a high throughput computation engine, matrix multiplication logic, matrix transpose logic, finite filter logic, sum of absolute difference logic, histogram computation logic, gather-scatter instruction implementation logic, transcendental vector execution logic, or the like. In some embodiments, the shared data processing logic may include execution units, such as, for example, SIMD execution units (e.g., potentially relatively wide SIMD execution units). In some embodiments, the shared core extension logic may interact with shared core extension data structures 208 (e.g., matrixes, tables, etc.), for example in the memory 218.

Advantageously, as compared to replicating logic, the shared core extension logic may help to reduce one or more of the overall die area needed to implement the logic, the cost of manufacturing the logic, and/or the power consumed by the logic. That is, the shared core extension logic may allow multiple cores to share common data processing function evaluation hardware resources without incurring the generally high integration costs of replicating such resources per-core. For clarity, it is not required that the particular shared data processing logic be large, although the greatest benefits of size, cost, and power reductions will often be achieved when relatively large logic is shared by the cores instead of being replicated per core. Moreover, the greatest benefits will often be achieved when the shared logic would otherwise, if it had been replicated per core, have been relatively underutilized, since the sharing may tend to increase the utilization of the logic whereby underutilized or unnecessary logic may be consolidated to reduce die area and manufacturing cost. As a further advantage, the shared core extension logic may also potentially be used to allow the cores to be customized or optimized for one type of processing (e.g., for scalar workloads performance, power and area), while allowing the shared core extension logic to be customized or optimized for another type of processing (e.g., for throughput-oriented workload performance, power and area).

FIG. 3 is a block diagram of an embodiment of a processor 310 having a core 0 311-0 including an example embodiment of shared core extension interface logic 313 and having an embodiment of shared core extension logic 314 including an example embodiment of core interface logic 315. As previously described, the processor may also include one or more other cores through a core M (not shown). In addition to the shared core extension interface logic 313, the core 0 also has conventional logic 334 of the type conventionally found in cores (e.g., one or more execution units, architectural registers, one or more caches, microarchitectural logic, etc.). The scope of the invention is not limited to any known such conventional logic. In addition to the core interface logic 315, the shared core extension logic 314 also has shared data processing logic 316 and a scheduler 344 to schedule data processing or tasks from multiple cores on the shared data processing logic.

Each of one or more physical threads running on the core 0 311-0 may use the shared core extension interface logic 313 to interface with the shared core extension logic 314. The shared core extension interface logic 313 includes shared core extension utilization instructions 323 of an instruction set 322 of the core 0. The instruction set is part of an instruction set architecture (ISA) of the core. The ISA represents the part of the architecture of the core related to programming. The ISA commonly includes the native instructions, architectural registers, data types, addressing modes, memory architecture, interrupt and exception handling, and the like, of the processor. The ISA is distinguished from the micro-architecture, which generally represents the particular design techniques selected to implement the ISA. Processors or cores with different micro-architectures may share a common ISA. The instructions of the instruction set, including the shared core extension utilization instructions 323, represent machine instructions, macroinstructions, or higher-level instructions (e.g., instructions provided to the core for execution), as opposed to microinstructions, micro-ops, or lower-level instructions (e.g., those which result from decode logic decoding machine instructions or macroinstructions).

The shared core extension interface logic 313 also includes a core 0, thread 0 set of shared core extension command registers (SCECRs) 328. Each physical thread may have a set of SCECRs registers associated with it as part of its context to be saved and restored irrespective of the progress of other threads. In some embodiments, for the core 0 the there may be multiple sets of SCECRs provided per-thread for each of one or more physical threads that run on the core 0. For example, in the illustrated embodiment, the core 0, thread 0 SCECRs may belong to a thread 0. Similarly, each physical thread running on the core 0 may have a set of core 0, thread-specific SCECRs to interface with the shared core extension logic 314. Alternatively, there may be a single set of core 0 SCECRs for the core 0. In such cases, there may be time sharing of the SCECRs between the physical threads at the hardware level. Context may be swapped out of the core 0 SCECRs on context switches and saved and restored.

In the illustration, an SCECR 0 328-0 through an SCECR N 328-N are shown. That is, there are N+1 registers. The number N+1 may be any desired number, such as two, four, eight, sixteen, thirty-two, sixty-four, or some other number. There is no requirement for the number N+1 to be a power of two, although this generally tends to provide efficient register addressing. A given one of these registers is generically represented herein as SCECR x, where the x may represent any one of register SCECR 0 through SCECR N.

In some embodiments, the shared core extension command registers may be architecturally-visible registers of the ISA of the core and/or the processor. The architectural registers generally represent on-die processor storage locations. The architectural registers may also be referred to herein simply as registers. Unless otherwise specified or apparent, the phrases architectural registers and registers are used herein to refer to a registers that are visible to the software and/or programmer (e.g., software-visible) and/or the registers that are specified by macroinstructions. These registers are contrasted to other non-architectural or non-architecturally visible registers in a given microarchitecture (e.g., temporary registers used by instructions, reorder buffers, retirement registers, etc.).

The shared core extension utilization instructions 323 are used to submit, monitor, and abort calls to the shared core extension logic 314 for data processing to be performed. By way of example, the shared core extension utilization instructions may be used for parallel programming and may be included in an instruction set (e.g., as an extension of the instruction set) to increase the efficiency and/or throughput of parallel programming workloads. The shared core extension utilization instructions may explicitly specify (e.g., through bits or one or more fields) or otherwise indicate (e.g., implicitly indicate) a shared core extension command register (SCECR x) of the core 0 shared core extension command registers 328. The shared core extension registers may provide an architectural hardware interface of the processor to the shared core extension logic.

In the illustrated embodiment, the shared core extension utilization instructions 323 include a shared core extension (SCE) call instruction 324 that has a format SCE call (SCECR x, parameters). The SCECR x indicates one of the core 0 shared core extension command registers 328 and the parameters indicate one or more parameters associated with the call, which will be discussed further below. The illustrated shared core extension utilization instructions also include an SCE read instruction 325 having a format SCE read (SCECR x). Another shared core extension utilization instructions is an SCE abort instruction 326 having a format SCE abort (SCECR x). Yet another shared core extension utilization instructions is an SCE wait instruction 327 having a format SCE wait (SCECR x). Each of these instructions may include an operation code or opcode (e.g., a plurality of bits or one or more fields) that is operable to identify the instruction and/or the operation to be performed. The functionality of each of these illustrative shared core extension utilization instructions will be discussed further below.

It is to be appreciated that this is just one illustrative example of a suitable set of shared core extension utilization instructions. For example, in other embodiments, some of the illustrated instructions may optionally be omitted and/or additional instructions may optionally be added to the shared core extension utilization instructions. Moreover, other shared core extension utilization instructions and sets of them are contemplated and will be apparent to those skilled in the art and having the benefit of the present disclosure.

One of the physical threads running on the core 0 311-0 may issue one of the shared core extension utilization instructions 323. The shared core extension utilization instruction issued by that thread may indicate an appropriate core 0 shared core extension command registers 328. The appropriate core 0 shared core extension command registers may correspond to the thread (e.g. thread 0) and provide context per thread.

Referring again to FIG. 3, the core 0 includes decode logic 348. The decode logic may also be referred to as a decoder or decode unit. The decode logic may receive and decode higher-level machine instructions or macroinstructions, and output one or more lower-level micro-operations, microcode entry points, microinstructions, or other lower-level instructions or control signals that reflect and/or are derived from the original higher-level instruction. The one or more lower-level control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to perform instruction decoding known in the art. Moreover, in some embodiments, an instruction emulator, translator, morpher, interpreter, or other instruction conversion logic may be used either instead of and/or in addition to the decode logic.

SCE instruction execution logic 330 is coupled with the decode logic 348 and with the core 0 shared core extension command registers 328. The shared core extension instruction execution logic may receive from the decoder one or more micro-operations, micro-code entry points, microinstructions, other instructions, or other control signals, which reflect, or are derived from, the shared core extension utilization instructions. The shared core extension instruction execution logic is operable to perform actions in response to and/or as specified by the shared core extension utilization instructions (e.g., in response to the control signals from the decoder). In some embodiments, the shared core extension instruction execution logic and/or the processor may include specific or particular logic (e.g., circuitry or other hardware potentially combined with software and/or firmware) operable to execute and/or process the shared core extension utilization instructions and perform actions in response to and/or as specified by the shared core extension utilization instructions.

In the illustrated embodiment, the shared core extension instruction execution logic is included within shared core extension control logic 329. The shared core extension control logic is coupled with the shared core extension command registers 328, the decode logic 348, and a memory management unit 331, which will be discussed further below. The shared core extension control logic may assist with various control, management, coordination, timing, and related implementation aspects of the shared core extension interface logic 313.

As mentioned above, the instruction set of the core 0 includes the SCE call instruction 324. The SCE call instruction may be used to submit a call to the shared core extension logic 314 to have data processing performed on behalf of the core (e.g., on behalf of a thread running on the core). By way of example, a physical or logical thread running on the core 0 may issue an SCE call instruction in order to send a call or command for data processing to be performed to the shared core extension logic. In some embodiments, the call or command may be passed through one or more of the shared core extension command registers 328 to the shared core extension logic. For example, the shared core extension call instruction of an embodiment may specify or otherwise indicate one of the core 0 shared core extension command registers 328 (e.g., SCECR x). That is the shared core extension command registers may be accessible from the thread(s) on the cores using the new SCE call macroinstruction. In some embodiments the SCE call instruction may also specify or otherwise indicate one of more parameters to further specify, qualify, or define the data processing that is to be performed. Data may be written or stored in the indicated shared core extension command register (e.g., SCECR x) based on the SCE call instruction (e.g., based on the one or more parameters of the SCE call instruction). If a current SCE call is made to an shared core extension command register that is already dedicated to or occupied by a previous SCE call then the current SCE call may be blocked until the occupied shared core extension command register is released (e.g., when the associated call completes or is aborted). Subsequently, the shared core extension logic may access the indicated shared core extension command register (e.g., SCECR x), including the data written or stored therein, and may implement the call or command (e.g., perform the requested data processing).

FIG. 4 is a block flow diagram of an embodiment of a method 450 of processing an embodiment of SCE call instruction. In embodiments, the method may be performed by a processor, a core, or another type of instruction processing apparatus. In some embodiments, the method 450 may be performed by the processor 210 of FIG. 2, or the core 0 311-0 of FIG. 3, or a similar processor or core. Alternatively, the method 450 may be performed by an entirely different processor, core, or instruction processing apparatus. Moreover, the processor 210, and the core 311-0, may perform embodiments of operations and methods either the same as, similar to, or different than those of the method 450.

A SCE call instruction is received within a core of a processor having a plurality of cores, at block 451. In various aspects, the SCE call instruction may be received at the core from an off-core source (e.g., from a main memory, a disc, or a bus or interconnect), or may be received at a portion of the core (e.g., at decode logic, scheduling logic, etc.) from other logic within the core (e.g., an instruction cache, queue, scheduling logic, etc.). The SCE call instruction is to cause the core to call shared core extension logic to have data processing performed. The shared core extension logic is shared by the plurality of cores. The SCE call instruction indicates a shared core extension command register, and also indicates one or more parameters. The one or more parameters specify the data processing that is to be performed by the shared core extension logic.

In some embodiments, the one or more parameters may provide one or more of a pointer (e.g., explicit virtual memory pointers) to a command attribute data structure in memory having command attributes associated with the call, one or more pointers (e.g., one or more explicit virtual memory pointers) to one or more input data operands in memory upon which data processing is to be performed, and one or more pointers (e.g., one or more explicit virtual memory pointers) to one or more output data operands in memory where results of the data processing are to be stored. For example, in some embodiments, the one or more parameters may provide information to be stored in and/or used to derive the fields shown in FIG. 5, which will be discussed further below. Alternatively, in other embodiments, one or more fields may have direct encodings of opcodes and arguments instead of memory pointers.

The shared core extension logic is called, in response to the SCE call instruction, to have the data processing performed, at block 452. In some embodiments, calling the shared core extension logic may include writing or otherwise storing data in the shared core extension command register indicated by the instruction based on the one or more parameters indicated by the instruction.

Figure 5:
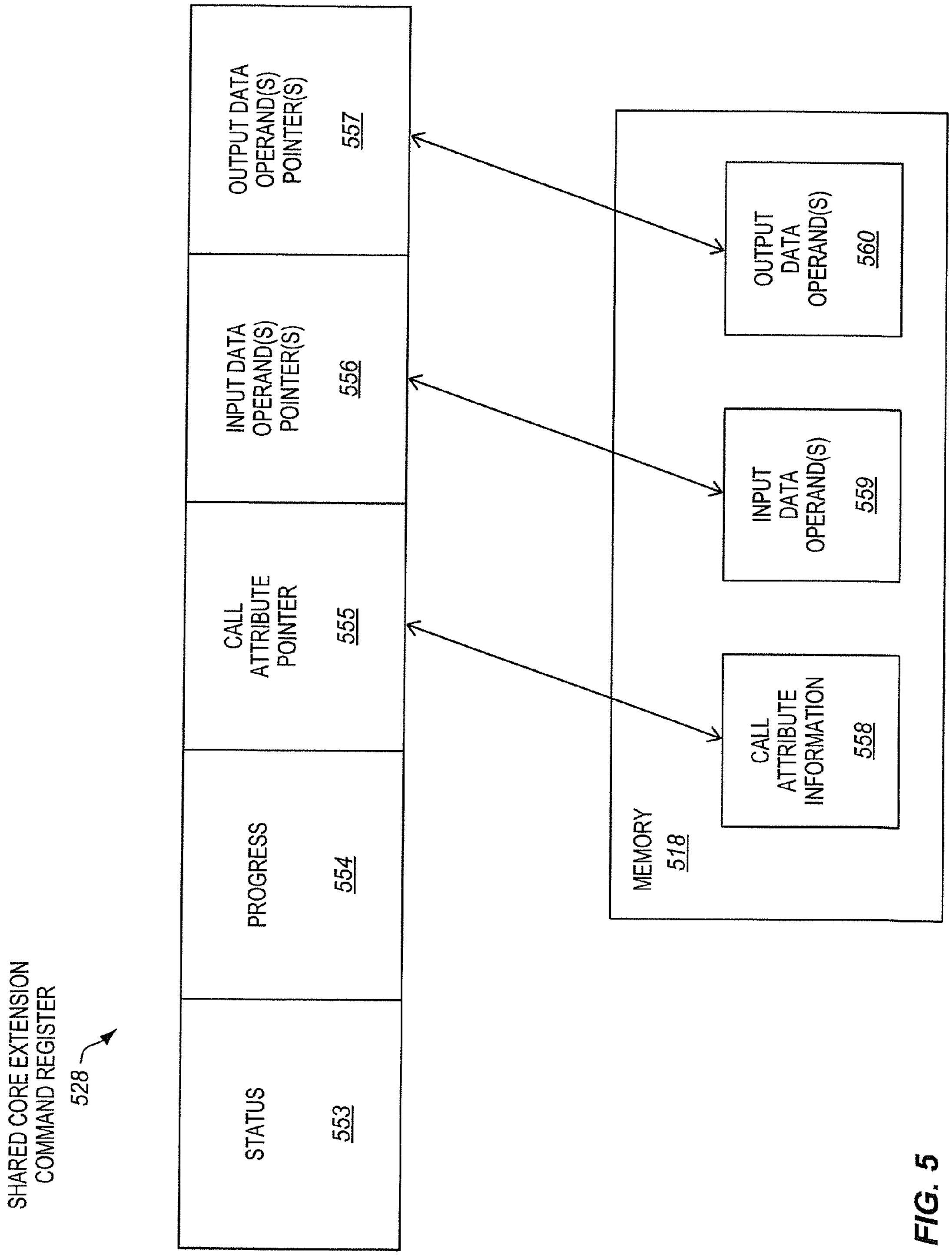
FIG. 5 is a block diagram of an example embodiment of a shared core extension command register.

FIG. 5 is a block diagram of an example embodiment of a shared core extension command register 528. The shared core extension command register has a number of fields. In the illustrated embodiment, these fields include, from left to right, a status field 553, a progress field 554, a command pointer field 555, an input data operand(s) pointer(s) field 556, and an output data operand(s) pointer(s) field 557. Each of these fields may include a number of bits sufficient to convey the information desired for the particular implementation.

The status field 553 may be used to provide a status of the call corresponding to the shared core extension command register. Examples of such status include, but are not limited to, the call is valid (e.g., it is in progress), the call has been completed, the call has an error, or the like. By way of example, two bits may be used to specify any of the aforementioned three status conditions. In another example, a single bit may be used to encode either of two status conditions, such as valid and invalid. The valid may represent that the call is currently in progress. The invalid may indicate that an error has occurred.

The progress field 554 may be used to provide a progress of the call corresponding to the shared core extension command register. The progress may represent a level of completion progress, or how far the call or command has progressed toward completion. The progress field may effectively implement a counter of sorts that counts the amount of work completed so far in executing the call. In some embodiments, the progress may be represented by atomic commit points. For example, the counter may be incremented whenever an atomic sub-operation is completed by the SCE logic. The atomic sub-operation may vary from one type of data processing to another (e.g., in one example when a certain number of cache lines of data have been processed). In some embodiments, the progress field may be used to provide progress atomicity with respect to the data processing of the shared core extension logic and an ability to pre-empt and re-schedule a running command on the shared core extension logic. When execution of a call is interrupted (e.g., on a context switch from one thread to another or on a fault), the progress field may be saved. Later, the progress field may be restored and the data processing associated with the call resumed (e.g., when the thread resubmits). Restoring the progress field may allow the data processing to resume where it left off. This is useful, especially when the amount of data processing to be performed by the SCE logic is relatively large and/or takes a relatively large amount of time to complete.

The command pointer field 555 may be used to provide a pointer that points to call or command attribute information 558 of the call corresponding to the shared core extension command register. In some embodiments, the call attribute information may be included in a call attribute data structure. In some embodiments, the call attribute information may be stored at one or more memory locations in a memory 518. In some embodiments, the pointer may be an explicit virtual memory pointer. The call attribute information may further specify, qualify, define, or characterize the attributes of the call. For example, the call attribute information may further specify, qualify, define, or characterize the precise type of data processing that is to be performed by the shared core extension logic. In some embodiments, the commands attributes may describe processing that represents relatively simple or short processing routines or functions, such as, for example, operations to transpose a matrix, operations to generate a histogram, operations to perform a filter, or the like. The command attributes may describe a sequence of operations to perform on one or more input data operands (e.g., one or more input data structures) to produce one or more output data operands (e.g., one or more output data structures). In some embodiments, they may be any of various such relatively simple algorithms or routines typically performed in hardware accelerators or graphics processing units or the like.

The input data operand(s) pointer(s) field 556 may be used to provide one or more pointers that point to one or more input data operands. The input data operands are those on which data processing is to be performed by the shared core extension logic. In some embodiments, the one or more input data operands may represent one or more data structures, such as, for example, matrices, tables, etc. As shown, in some embodiments, the pointer(s) may point to input data operand(s) in memory location(s) in the memory 518. In some embodiments, the pointer(s) may be explicit virtual memory pointer(s). In other embodiments, the pointers may point to one or more input data operands in one or more registers or other storage locations.

The output data operand(s) pointer(s) field 557 may be used to provide one or more pointers that point to one or more output data operands. The output data operands are those used to convey results of the data processing that has been performed by the shared core extension logic at the completion of the call. In some embodiments, the one or more output data operands may represent one or more data structures, such as, for example, matrices, tables, etc. As shown, in some embodiments, the pointer(s) may point to output data operand(s) in memory location(s) in the memory. In some embodiments, the pointer(s) may be explicit virtual memory pointer(s). In other embodiments, the pointers may point to one or more output data operands in one or more registers or other storage locations.

It is to be appreciated that this is just one example embodiment of a suitable format for a shared core extension command register. Alternate embodiments may omit some of the illustrated fields or may add additional fields. For example, one or more of the fields may be provided through an implicit location that need not be explicitly specified in the shared core extension command register. As another example, an input data operand storage location may be reused as an output data operand storage location such that it need not be specified twice but one of the specifications may be implicit. As yet another example, one or more fields may have direct encodings of opcodes and arguments instead of memory pointers. Moreover, the illustrated order/arrangement of the fields is not required, but rather the fields may be rearranged. Furthermore, fields need not include contiguous sequences of bits (as suggested in the illustration) but rather may be composed of non-contiguous or separated bits.

Referring again to FIG. 3, after the execution of the SCE call instruction, an shared core extension command register indicated by the SCE call instruction (e.g., SCECR x) may store data corresponding to the SCE call instruction. After the thread or core submits the task or call, the thread or core may proceed to prepare and submit additional calls or tasks to the shared core extension logic before the earlier submitted calls or tasks complete. Additionally, the thread or core may proceed to perform other processing while the previously submitted calls or tasks complete. The shared core extension command registers together with a scheduler (which will be discussed further below) may help to provide fine-grain control flow which may allow multiple threads and/or multiple cores to submit tasks or calls and then proceed to submit other tasks or calls or perform other processing while and until the tasks or calls complete on the shared core extension logic.

The shared core extension logic 314 includes core interface logic 315 to access the core 0 shared core extension command registers 328. The core interface logic may also be used to access the core M shared core extension command registers 340, as well as for any other cores (if any). That is, in some embodiments, the shared core extension logic and/or the core interface logic may access a separate set of shared core extension command registers for each of the cores.

The shared core extension logic may use the shared core extension command registers 328. For example, the shared core extension logic may access the command attribute information pointed to by the command field (e.g., field 555), may access the input data operands pointed to by the input data operands field (e.g., field 556), may update progress as a result of data processing in the progress field (e.g., field 554), when the operation is done or encounters an error may update the status field (e.g., field 553) to reflect complete or an error, and in the event of completion without an error may access the output data operands through the pointer in the output data operands field (e.g., field 557).

To facilitate the description, the shared core extension logic is shown as having a copy of the core 0, thread 0 shared core extension command registers. However, the shared core extension command registers of the shared core extension logic are shown in dashed lines to indicate that there may not actually be two sets of the core 0, thread 0 shared core extension command registers. Rather, both the core 0 and the shared core extension logic may logically view the same set of core 0, thread 0 shared core extension command registers. Similarly, the shared core extension logic may view the corresponding shared core extension command registers of other threads of other processors through potentially a core M, thread P set 340. Also for clarity, the physical core 0, thread 0 shared core extension command registers may be located in the core 0, in the shared core extension logic, in a location outside the core 0 and outside the shared core extension logic, or in a combination of different locations.

The shared core extension logic 314 includes an embodiment of a scheduler 344. The scheduler may be implemented in hardware, software, firmware, or some combination. In one aspect, the scheduler may be a hardware scheduler. The scheduler may be operable to access the core 0 shared core extension command registers 328, through the core M shared core extension command registers 340, and schedule data processing associated with calls conveyed through these registers on the shared data processing logic 316. In some embodiments, the scheduler may represent a programmable hardware scheduler or programmable hardware scheduling logic to schedule the data processing for the cores according to a programmable scheduling algorithm or objective. In some embodiments, the hardware scheduler may be implemented as a state machine that is operable to rotate between command registers and between physical threads. Arbitration policies may potentially be exposed to software through a set of machine specific registers (MSRs). In other embodiments, the hardware scheduler may be implemented as a firmware block, for example incorporating both fixed read only memory (ROM) and patchable random access memory (RAM) domains. This may potentially allow the hardware scheduler to use more elaborate scheduling algorithms, which may rely on operating system directives, application programming interfaces (APIs), run-time compiler directives, real-time hardware signals, or a combination of such controls. By way of example, the scheduling may be a fair scheduling algorithm, a weighted scheduling algorithm for some of the cores over others (e.g., based on core load, time criticality of the thread or data being processed, thread priority, or according to other objectives). Many different types of scheduling algorithms known in the arts are suitable for different implementations depending upon the particular objectives of those implementations. The scheduler may also monitor the completion of the calls or tasks scheduled on the shared data processing logic.

The shared core extension logic 314 also includes status and/or progress update logic 349. The status and/or progress update logic may monitor the status and/or progress of the calls being handled by the shared data processing logic 316. The status and/or progress update logic may also update shared core extension command registers corresponding to the calls based on the monitored status and/or progress. For example, the status field 553 and the progress field 554 of FIG. 5 may be updated. By way of example, when a call completes on the shared core extension logic, the status may be updated to reflect completed, or when processing of a call on the shared core extension logic encounter an error the status may be updated to reflect an error condition. As another example, throughout the data processing associated with a call, the status and/or progress update logic may update the progress of the completion of the call (e.g., may update atomic commit points in the progress field 554).

In some embodiments, an operating system may use a state save/state restore functionality (e.g., xsave/xrestore in Intel Architecture) to manage the state of shared core extension command registers on context switches. Calls or commands that have not yet been completed by the shared core extension logic may be saved and then restored and relaunched by the physical thread on a context switch. In some embodiments, to support context switch and operating system pre-emption, the shared core extension command registers may have the aforementioned progress field to record (e.g., atomic progress) of the data processing task being handled by the shared core extension logic. The progress field may be saved on context switch as part of the thread context, and used for task resumption when the operating system reschedules the thread.

The shared core extension logic 315 also includes shared core extension control logic 343. The shared core extension control logic is coupled with the scheduler 344, the shared data processing logic 316, the status/progress update logic 349, the core 0-M shared core extension command registers 328, 340, and a shared core extension memory management unit (MMU) 341, which will be discussed further below. The shared core extension control logic may assist with various control, management, coordination, timing, and related implementation aspects of the shared core extension logic 314.

Refer again to the SCE call instruction 324 of FIG. 3 and/or the SCE call instruction of the method of FIG. 4, in some embodiments, the SCE call instruction may be a non-blocking SCE call instruction. In some embodiments, the non-blocking SCE call instruction may be sent non-speculatively from a thread (e.g., a physical thread), and may retire at a core on which the issuing thread is running after the non-blocking SCE call instruction has been accepted for execution at the shared core extension logic (e.g., stored in the SCE command register).

In other embodiments, the SCE call instruction may be a blocking SCE call instruction. In some embodiments, the blocking SCE call instruction may be sent non-speculatively from a thread (e.g., a physical thread), and may retire at a core on which the issuing thread is running after execution of the call or task has completed at the shared core extension logic (e.g., when the status field of the shared core extension command register is updated to reflect completed). In some embodiments, both non-blocking and blocking variants of SCE call instructions may be included in the instruction set.

In some embodiments, a blocking SCE call instruction may specify or otherwise indicate a timeout value (e.g., a number of cycles) to wait for a shared core extension command register release. For example, this number of cycles or other timeout value may be specified in one of the parameters of the SCE call instruction. In some embodiments, a failure, fault, error, or the like, may be returned in response to the call if the timeout value is reached without the shared core extension command register being released.

Following the retirement of an SCE call instruction, the shared core extension logic may modify memory state according to the assigned task or call. In a multi-threaded environment, software synchronization may be performed to maintain cache coherency and memory ordering between logical threads that may use the shared core extension and have shared operands. Alternatively, hardware synchronization may also optionally be performed.

FIG. 6 is a block flow diagram of an embodiment of a method 662 of processing an embodiment of SCE read instruction. In embodiments, the method may be performed by a processor, a core, or another type of instruction processing apparatus. In some embodiments, the method 662 may be performed by the processor 210 of FIG. 2, or the core 0 311-0 of FIG. 3, or a similar processor or core. Alternatively, the method 662 may be performed by an entirely different processor, core, or instruction processing apparatus. Moreover, the processor 210, and the core 311-0, may perform embodiments of operations and methods either the same as, similar to, or different than those of the method 662.

A shared core extension (SCE) read instruction is received within a core of a processor having a plurality of cores, at block 663. In various aspects, the SCE read instruction may be received at the core from an off-core source (e.g., from a main memory, a disc, or a bus or interconnect), or may be received at a portion of the core (e.g., at decode logic, scheduling logic, etc.) from other logic within the core (e.g., an instruction cache, queue, scheduling logic, etc.). The SCE read instruction to cause the core to read a status of a previously made call to shared core extension logic. The shared core extension logic is shared by the plurality of cores. The SCE read instruction indicates a shared core extension command register.

The status of the previously made call to the shared core extension logic is read, in response to the SCE read instruction, at block 664. In some embodiments, reading the status may include reading data from the shared core extension command register indicated by the instruction. In some embodiments, the status may include completion status. For example, a status field (e.g., the status field 553 in FIG. 5) may be read. In some embodiments, the read status may be selected from completed, error, valid, although the scope of the invention is not so limited.

In other embodiments, the SCE read instruction may read other information from the indicated shared core extension command register. Examples of such information include, but are not limited to, progress (e.g., from progress field 554 of FIG. 5), an output data operand or a portion thereof (e.g., as indicated by field 557), and command attribute information (e.g., as indicated by field 555). In some embodiments, the shared core extension command register corresponds to a previous call to the shared core extension logic to have data processing be performed on behalf of the core receiving the SCE read instruction.

FIG. 7 is a block flow diagram of an embodiment of a method 766 of processing an embodiment of SCE abort instruction. In embodiments, the method may be performed by a processor, a core, or another type of instruction processing apparatus. In some embodiments, the method 766 may be performed by the processor 210 of FIG. 2, or the core 0 311-0 of FIG. 3, or a similar processor or core. Alternatively, the method 766 may be performed by an entirely different processor, core, or instruction processing apparatus. Moreover, the processor 210, and the core 311-0, may perform embodiments of operations and methods either the same as, similar to, or different than those of the method 766.

A shared core extension (SCE) abort instruction is received within a core of a processor having a plurality of cores, at block 767. In various aspects, the SCE abort instruction may be received at the core from an off-core source (e.g., from a main memory, a disc, or a bus or interconnect), or may be received at a portion of the core (e.g., at decode logic, scheduling logic, etc.) from other logic within the core (e.g., an instruction cache, queue, scheduling logic, etc.). The SCE abort instruction is to cause the core to abort a previously made call to shared core extension logic. The shared core extension logic is shared by the plurality of cores. The SCE abort instruction indicates a shared core extension command register.

The previously made call to the shared core extension logic is aborted, in response to the SCE abort instruction, at block 768. In some embodiments, aborting the call may include stopping data processing by the shared core extension logic that corresponds to the previously made call and/or that corresponds to the indicated shared core extension command register. In some embodiments, aborting the call may also include releasing the occupied shared core extension command register indicated by the SCE abort instruction.

In some embodiments, a blocking SCE call instruction may specify or otherwise indicate a timeout value (e.g., a number of cycles) to wait for a SCECR release and the call may return a failure if the timeout elapses. The failure may occur either if the timeout is reached without the release and/or if the timeout is reached during in progress command execution that has not completed prior to the expiration of the timeout. For non-blocking call a SCE wait instruction may be used to block on shared core extension execution. The SCE wait instruction may similarly include a timeout value (e.g., a number of cycles) to wait for a shared core extension command register release. A failure, error, or the like may be returned if the timeout elapses without the shared core extension command register release. In some embodiments, the timeout value of the blocking SCE call instruction and/or the SCE wait instruction may be encoded as a variable parameter that the instruction may specify. In other embodiments, the timeout may be a fixed implicit value. In some embodiments, the SCE wait instruction may be used in conjunction with a non-blocking SCE call instruction to reduce power consumption. For example, when a blocking SCE call instruction blocks and/or when an SCE wait instruction blocks, the physical thread may optionally be halted and put to sleep (assuming there is no other work that is desired to be done) until the shared core extension logic wakes it on the relevant SCE call being completed. However, this is optional and not required. Moreover, other methods for aborting a call or command that runs for an unexpected or undesired long duration are also contemplated besides the aforementioned approach of indicating a timeout value through a blocking SCE call instruction and/or a SCE wait instruction.

In some embodiments, the SCE logic may operate on the same virtual memory as the core 0. Referring again to FIG. 3, the core 0 311-0 has a memory management unit (MMU) 331. The MMU includes shared core extension MMU interface logic 332. The MMU 331 may be substantially conventional except for the shared core extension MMU interface logic 332. The shared core extension logic 314 has a shared core extension MMU 341. The SCE MMU may maintain the page mapping of the core 0 (e.g., cache or preserve the translations from virtual or linear memory to system memory that are cached or preserved by the core 0). In addition to maintaining TLB entries corresponding to those of the TLB of core 0, the SCE MMU may also maintain TLB entries for each of the cores. The shared core extension MMU has core MMU interface logic 342. The shared core extension MMU interface logic 332 and the core MMU interface logic 342 interface with one another to perform synchronization 346 between the MMU 331 and the shared core extension MMU 341. In some embodiments, the shared core extension MMU interface logic 332 and the core MMU interface logic 342 may represent a hardware mechanism or hardware support for synchronization of the MMU 331 and the shared core extension MMU 341.

In some embodiments, synchronization between the MMU and the SCE MMU may be performed to maintain consistency in this page mapping. For example, when a page is invalidated by the core 0, the core 0 may invalidate a corresponding TLB entry of the core 0 MMU. In some embodiments, synchronization may also be performed between the core 0 and the SCE logic in which a corresponding TLB entry on the SCE MMU of the SCE logic may also be correspondingly invalidated. By way of example, a physical thread running on the core 0 may use the hardware interface provided by the shared core extension MMU interface logic 332 and the core MMU interface logic 342 to signal the SCE logic to invalidate the corresponding TLB of the SCE MMU through bus cycles on the processor. That is, in some embodiments, the synchronization of the shared core extension MMU 341 may be performed by hardware from within a physical thread running on the core 0. As another example, if a thread is swapped by the operating system (e.g., a context switch) then the SCE logic may be signaled and/or notified of the context switch so that the context associated with the thread may be saved so that they can be later restored. In some embodiments, such synchronization signaling may be at the hardware level (e.g., through bus cycles or bus transactions through a hardware mechanism). That is, the synchronization may be performed at the hardware level (e.g., through the hardware of the MMU and SCE MMU and bus transactions) rather than through software involvement (e.g., without involvement of the operating system).

In some embodiments, the MMU 331 and the shared core extension MMU 341 may also interact through the interface logic 332, 342 to route or communicate page faults that occurring when the shared core extension logic is processing calls for the core 0. In some embodiments, the shared core extension MMU may use the core 0 to notify the operating system of a page fault that has occurred while processing a call from the core 0. Similarly, the shared core extension MMU may notify other cores of page faults that occur while processing calls from these other cores. The cores may notify the operating system of the page faults. The operating system may not have any reason to know that the page fault actually originated at the SCE logic rather than at the core that provided the page fault. In some embodiments, for a non-blocking SCE call instruction, the instruction pointer on the core specifying the fault may be arbitrary. In some embodiments, for a blocking SCE call instruction, the instruction pointer for the faulting shared core extension logic may point to the SCE call instruction corresponding to the call that faulted on the calling thread.

The shared core extension logic offers a number of advantages over other approaches for offloading processing known in the arts. Conventionally, with hardware accelerators (e.g., graphics processing units), and the like, a software-based paradigm is used to interact with the hardware accelerators. The hardware accelerators are commonly managed by software device drivers. System calls are used by applications to utilize the processing of the hardware accelerators. Intervention of software (e.g., the operating system) is often needed to provide fair utilization of hardware accelerator by different threads running on the cores. As compared to such hardware accelerators, the shared core extension logic may allow a traditional programming paradigm of the cores utilizing the shared core extension logic (e.g., general-purpose cores) without shifting to the software paradigm of driver based hardware accelerator access. Moreover, in embodiments where the SCE logic operates on the same virtual memory as associated physical threads, it can be utilized without an accompanying overhead of data copying and/or data marshaling. Furthermore, as compared to a hardware accelerator, the shared core extension logic generally involves a smaller amount of open pages for making forward progress. In addition, as compared to a hardware accelerator, the shared core extension logic generally tends to reduce the latency overhead of submitting a command substantially to approximately the latency of a non-speculative core bus-cycle. Also, the SCE logic may use a scheduling unit in hardware or other logic on-processor to provide fair or distributed utilization among different threads running on cores, rather than through intervention of software (e.g., the operating system).

In the description above, for simplicity of illustration and description, embodiments have shown and described a single instance of shared core extension logic (e.g., logic 214, logic 314, etc.). However, in some embodiments there may be more than one shared core extension logic. Each of the shared core extension logic may be shared by multiple cores, which may be either the same cores or different cores, and which may be either all of the cores or some of the cores. In some embodiments, different types of shared core extension logic (e.g., to perform different types of data processing) may be included and shared among the cores. In other cases, multiple instances of the same general type of shared core extension logic may be included and shared among either all of the cores (e.g., their threads) or each of the shared core extension logic may be shared by a subset of the total number of cores (e.g., a different subset). Various arrangements are contemplated as will be appreciated by those skilled in the art and having the benefit of the present disclosure.

Components, features, and specific details described for FIG. 5 may optionally be used with those of FIG. 3, 4, or 6. The features and/or details described herein for an apparatus also optionally apply to the methods described herein which are performed by and/or with an apparatus. For example, components, features, and specific details described for FIG. 3 may optionally be used with those of FIG. 4, or 6.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 8A:
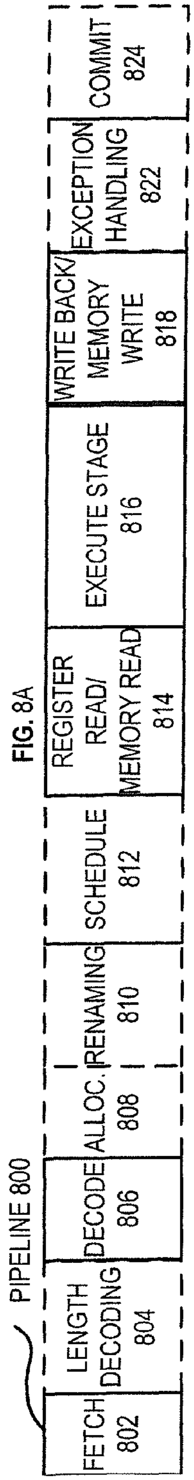
FIG. 8A is a block diagram illustrating both an exemplary in-order pipeline and an exemplary register renaming, out-of-order issue/execution pipeline according to embodiments of the invention.
Figure 8B:
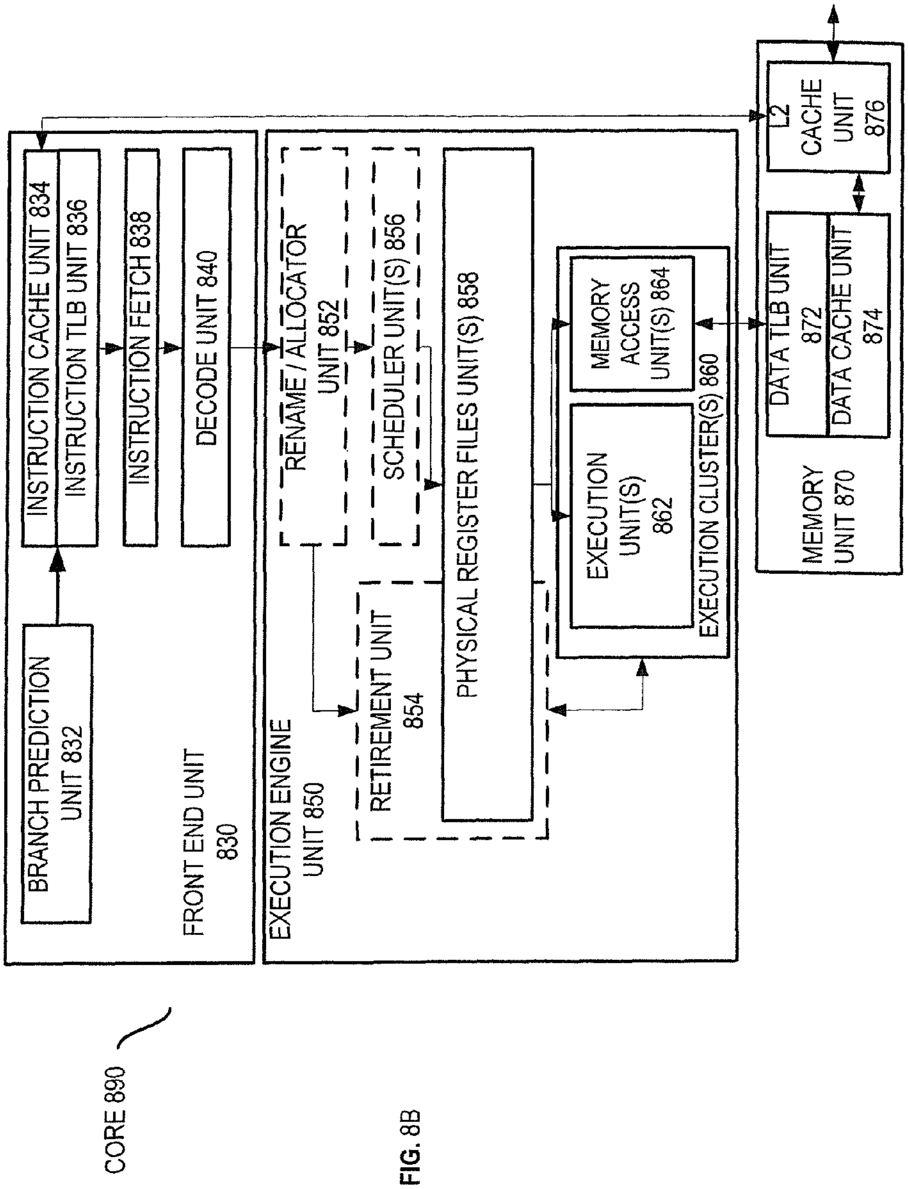
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9A:
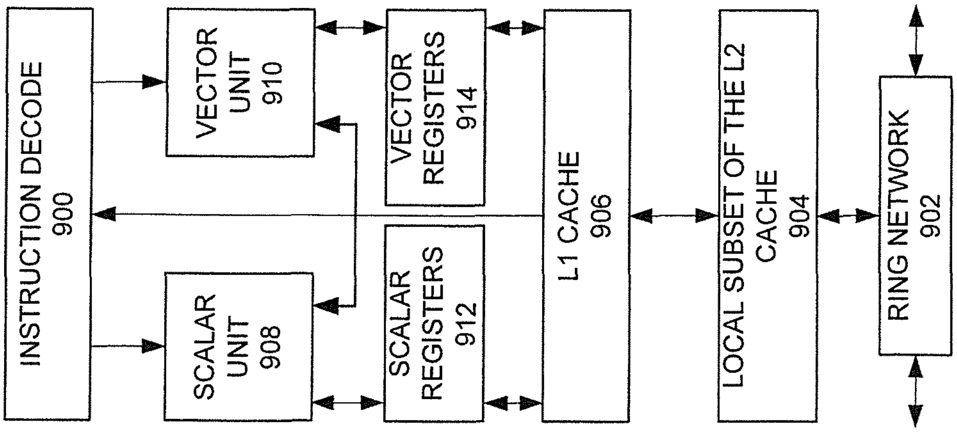
FIG. 9A is a block diagram of a single processor core, along with its connection to the on-die interconnect network and with its local subset of the Level 2 (L2) cache 904, according to embodiments of the invention.
Figure 9B:
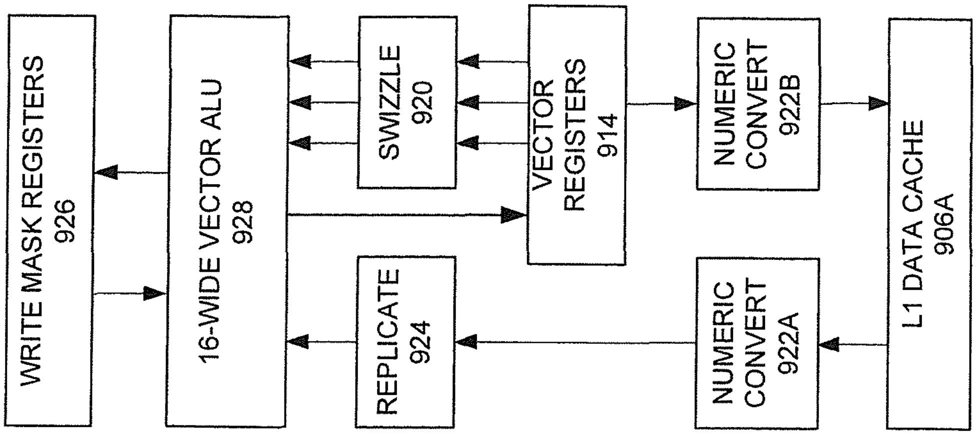
FIG. 9B is an expanded view of part of the processor core in FIG. 9A according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
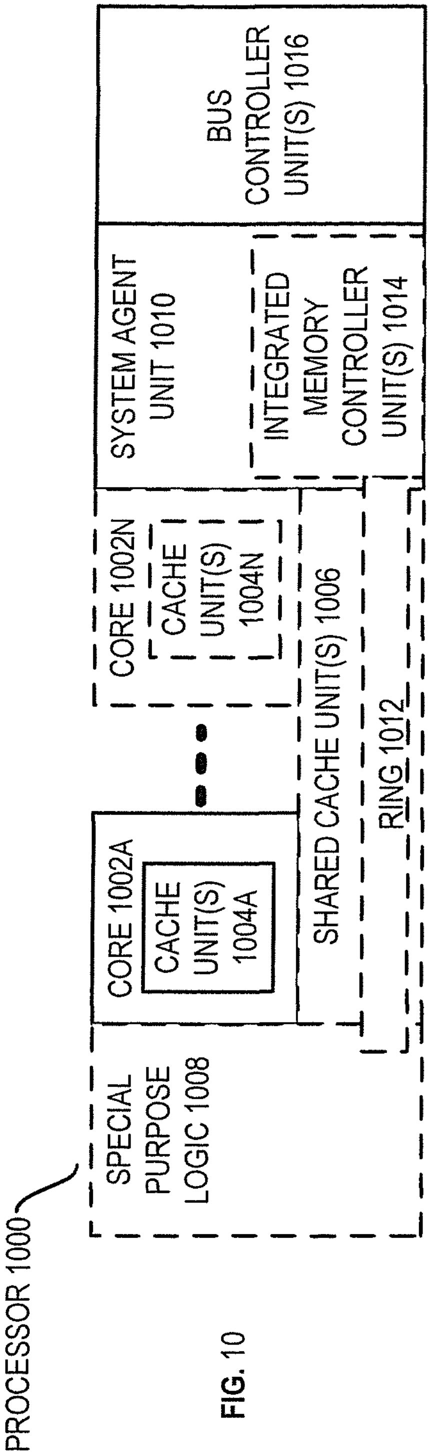
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1 002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
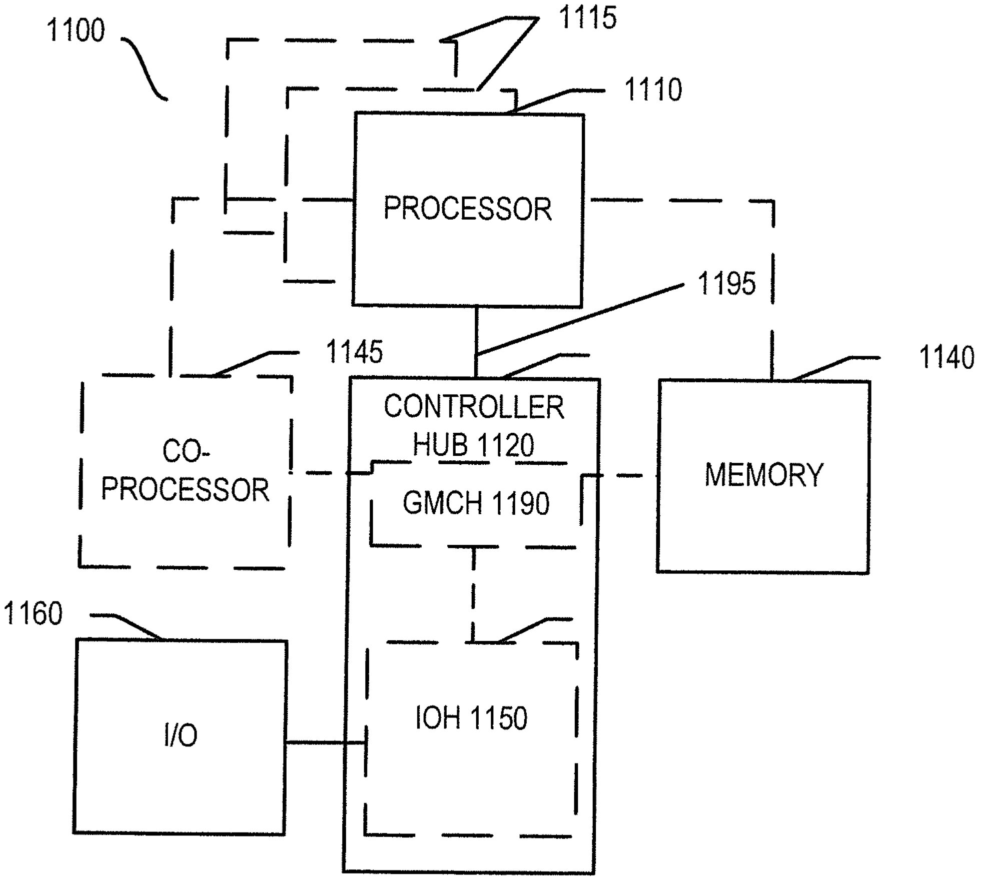
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
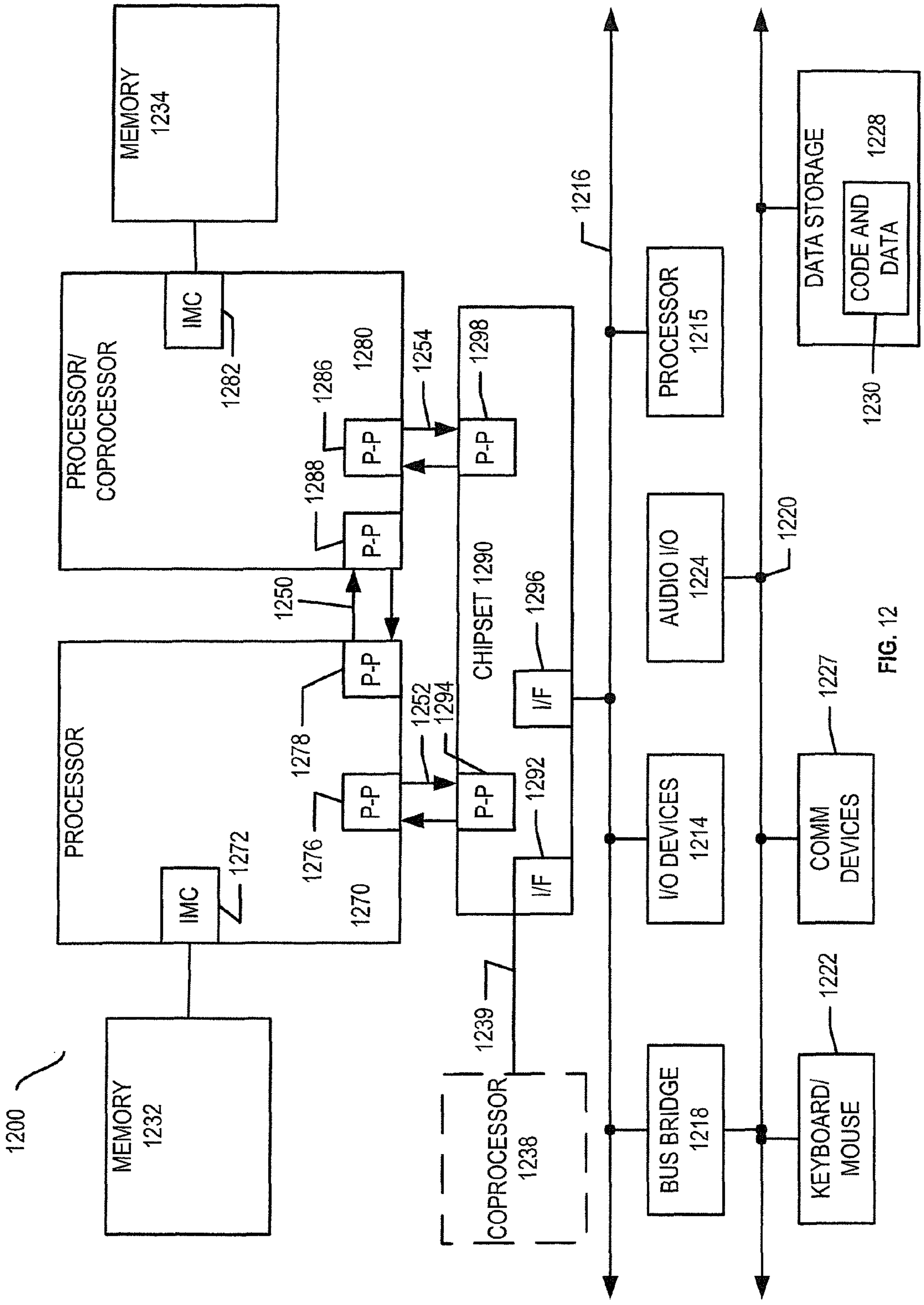
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
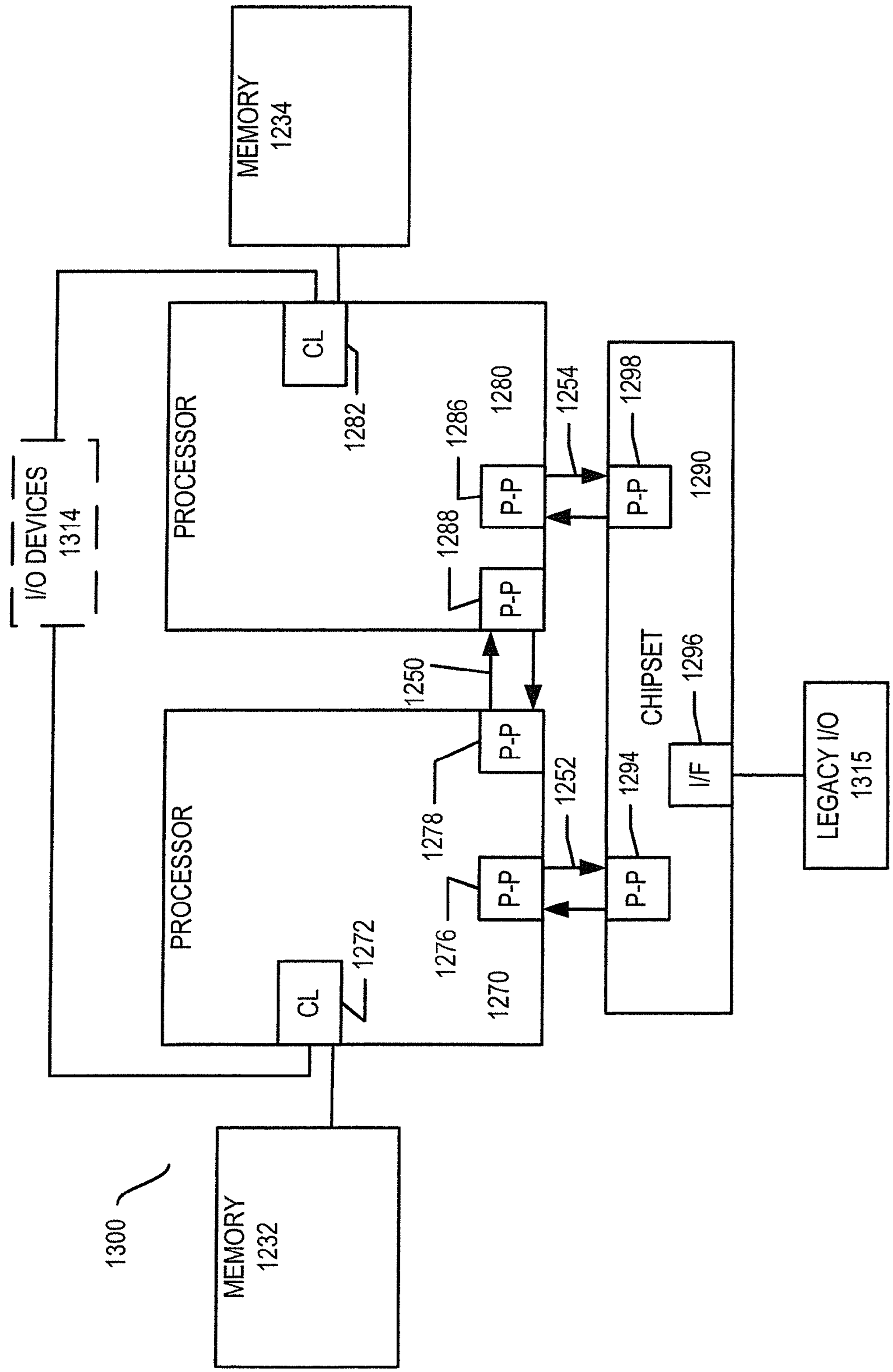
FIG. 13, shown is a block diagram of a second more specific exemplary system in accordance with an embodiment of the present invention.

Referring now to FIG. 13, shown is a block diagram of a second more specific exemplary system 1300 in accordance with an embodiment of the present invention Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
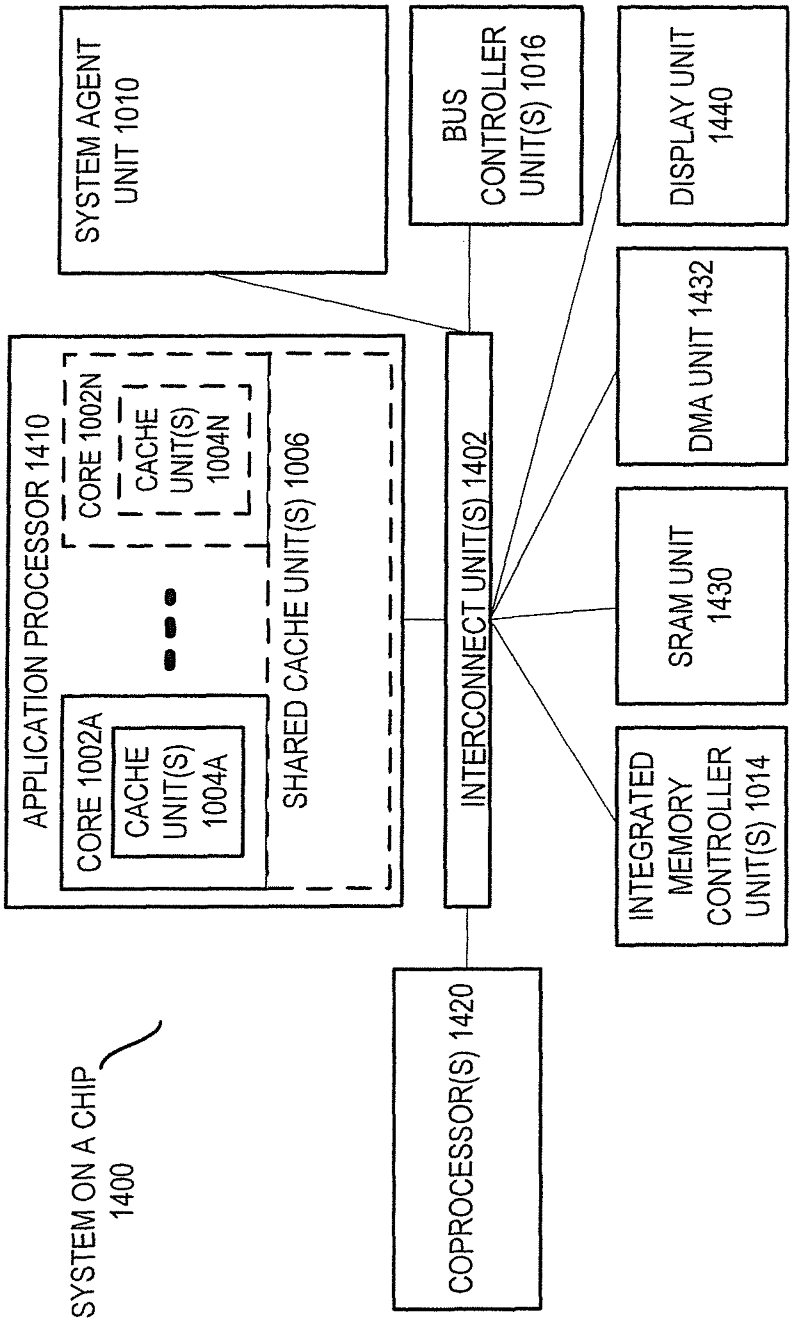
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
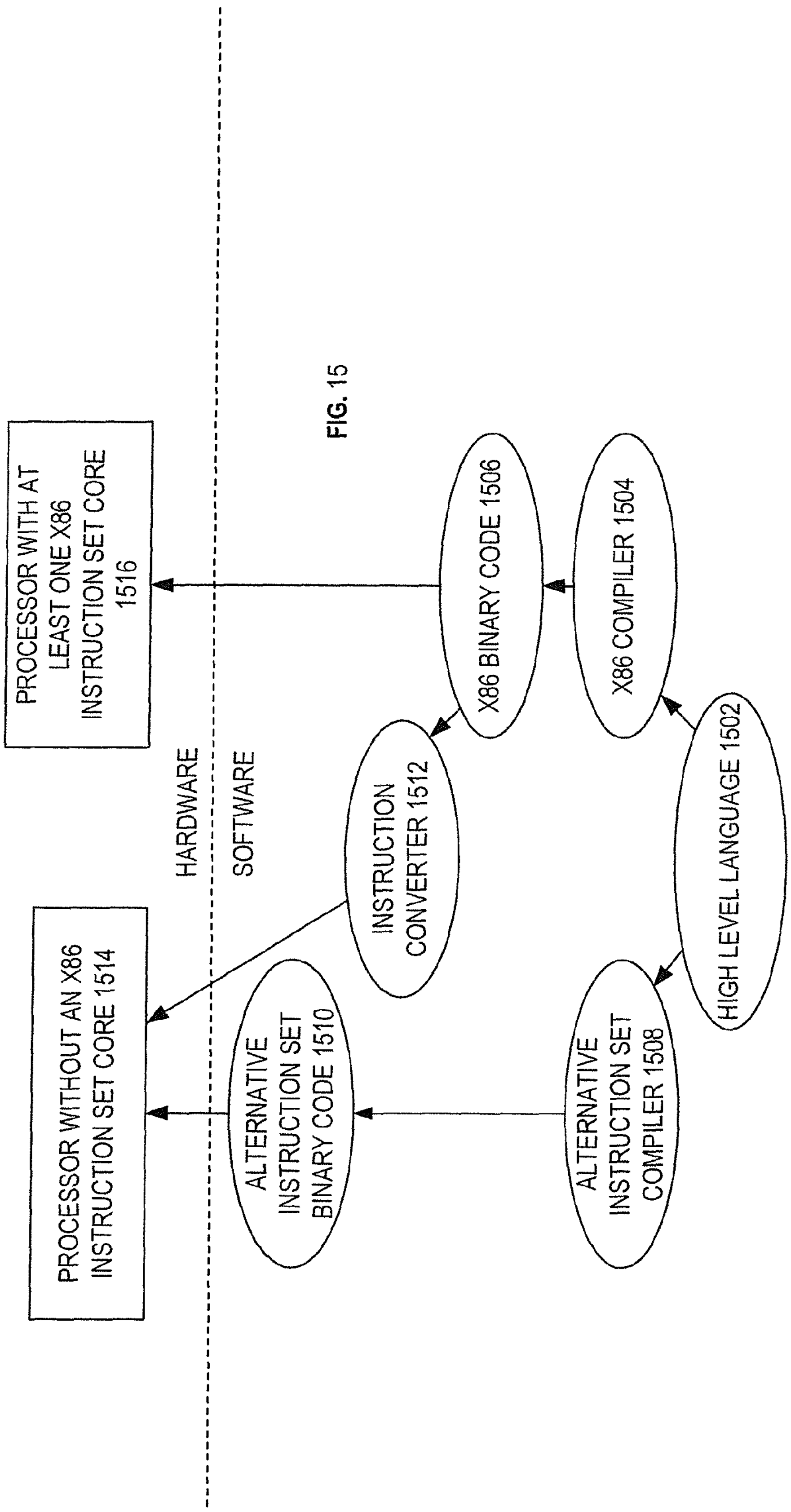
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1 516. The processor with at least one x86 instruction set core 1 516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1 516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1 514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1 514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

In the description and claims, the term "logic" may have been used. As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components (e.g., embedded in semiconductor materials).

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where multiple components have been shown in some cases they may be integrated into a single component. Where a single component has been shown and described, in some cases this single component may be separated into two or more components.

Certain methods disclosed herein have been shown and described in a basic form, although operations may optionally be added to and/or removed from the methods. In addition, a particular order of the operations may have been shown and/or described, although alternate embodiments may perform certain operations in different order, combine certain operations, overlap certain operations, etc.

Certain operations may be performed by hardware components and/or may be embodied in a machine-executable instruction that may be used to cause and/or result in a hardware component (e.g., a processor, potion of a processor, etc.) programmed with the instruction performing the operations. The hardware component may include a general-purpose or special-purpose hardware component. The operations may be performed by a combination of hardware, software, and/or firmware. The hardware component may include specific or particular logic (e.g., circuitry potentially combined with software and/or firmware) that is operable to execute and/or process the instruction and perform an action in response to the instruction (e.g., in response to one or more microinstructions or other control signals derived from the instruction).

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

The following clauses and/or examples pertain to further embodiments. Specifics in the clauses and/or examples may be used anywhere in one or more embodiments.

In one embodiment, a first apparatus includes a plurality of cores and a shared core extension logic coupled with each of the plurality of cores. The shared core extension logic has shared data processing logic that is shared by each of the plurality of cores. The first apparatus also includes instruction execution logic, for each of the cores, that in response to a shared core extension call instruction, is to call the shared core extension logic. The call is to have data processing performed by the shared data processing logic, on behalf of a corresponding core.

Embodiments include the first apparatus further including a plurality of shared core extension command registers coupled with the instruction execution logic and the shared core extension logic, where the shared core extension call instruction is to indicate one of the shared core extension command registers and a plurality of parameters.

Embodiments include any of the above first apparatus in which the instruction execution logic, in response to the shared core extension call instruction, is to store data in the indicated shared core extension command register based on the indicated parameters.

Embodiments include any of the above first apparatus in which the instruction execution logic, in response to the shared core extension call instruction, is to store in the indicated shared core extension command register: a pointer in a call attribute pointer field to point to call attribute information; a pointer in an input data operand pointer field to point to an input data operand; and a pointer an output data operand pointer field to point to an output data operand.

Embodiments include any of the above first apparatus in which the shared core extension logic is to store, based on data processing associated with the call, in the indicated shared core extension command register: a status field to provide a status of the call; and a progress field to provide a progress of the call.

Embodiments include any of the above first apparatus in which the shared core extension call instruction includes a macroinstruction of an instruction set of the cores.

Embodiments include any of the above first apparatus in which the shared data processing logic includes at least one vector execution unit.

Embodiments include any of the above first apparatus in which the shared data processing logic includes data processing logic that is not found in the plurality of cores.

Embodiments include any of the above first apparatus in which the instruction execution logic, in response to the shared core extension call instruction, is to call the shared core extension logic to have data processing performed on at least one input data structure in memory according to a routine to produce at least one output data structure in memory.

Embodiments include any of the above first apparatus further including: a memory management unit (MMU) of a first core of the plurality; a shared core extension MMU of the shared core extension logic; and a hardware interface between the MMU of the first core and the shared core extension MMU to exchange synchronization signals in hardware to synchronize the MMU of the first core and the shared core extension MMU.

Embodiments include any of the above first apparatus further including: a memory management unit (MMU) of a first core of the plurality; a shared core extension MMU of the shared core extension logic; and an interface between the MMU of the first core and the shared core extension MMU to route a page fault, which corresponds to a call from the first core, from the shared core extension MMU to the MMU of the first core.

Embodiments include any of the above first apparatus further including hardware scheduling logic on die with the shared core extension logic to schedule calls from the plurality of cores on the shared data processing logic.

In one embodiment, a first method includes receiving, within a core of a processor having a plurality of cores, a shared core extension call instruction. The shared core extension call instruction to cause the core to call a shared core extension logic, which is shared by the plurality of cores. The call is to have data processing performed. The shared core extension call instruction indicates a shared core extension command register and indicates a plurality of parameters that specify the data processing to be performed. The shared core extension logic is called, in response to the shared core extension call instruction, to have the data processing performed. Calling the shared core extension logic includes storing data in the shared core extension command register indicated by the instruction based on the parameters indicated by the instruction.

Embodiments include the first method in which receiving the instruction includes receiving a non-blocking shared core extension call instruction, and further including retiring the non-blocking shared core extension call instruction at the core after the shared core extension logic has accepted the data processing to be performed.

Embodiments include the first method in which receiving the instruction includes receiving a blocking shared core extension call instruction, and further including retiring the blocking shared core extension call instruction at the core after the shared core extension logic has completed the data processing.

Embodiments include the first method in which receiving the instruction includes receiving a blocking shared core extension call instruction, where the blocking shared core extension call instruction indicates a timeout value for a release of the indicated shared core extension command register.

Embodiments include any of the above first methods in which the shared core extension call instruction includes a macroinstruction of an instruction set of the core, and where the shared core extension command register comprise an architectural register.

Embodiments include any of the above first methods in which storing the data in the indicated shared core extension command register based on the parameters includes: storing a pointer in a call attribute pointer field to point to call attribute information; storing a pointer in an input data operand pointer field to point to an input data operand; and storing a pointer an output data operand pointer field to point to an output data operand.

Embodiments include any of the above first methods further including the shared core extension logic storing data in the indicated shared core extension register based on data processing associated with the call, the storing of the data including: storing a status in a status field of the indicated register to provide a status of the call; and storing a progress in a progress field of the indicated register to provide a progress of the call.

Embodiments include any of the above first methods in which calling includes calling the shared core extension logic to have data processing performed on at least one input data structure in memory according to a routine to produce at least one output data structure in memory.

Embodiments include any of the above first methods further including synchronizing a memory management unit (MMU) of the core and a shared core extension MMU of the shared core extension logic by exchanging synchronization signals in hardware between the MMU and the shared core extension MMU.

Embodiments include any of the above first methods further including routing a page fault corresponding to the call from a shared core extension memory management unit (MMU) to an MMU of the core.

Embodiments include any of the above first methods further including, before receiving the shared core extension call instruction: receiving a shared core extension abort instruction indicating the shared core extension command register; and stopping data processing corresponding to the shared core extension command register indicated by the shared core extension abort instruction, in response to the shared core extension abort instruction, and releasing the shared core extension command register.

Embodiments include any of the above first methods further including, after receiving the shared core extension call instruction: receiving a shared core extension read instruction indicating the shared core extension command register; and reading a data processing completion status from the shared core extension command register indicated by the shared core extension read instruction in response to the shared core extension read instruction.

In one embodiment, a machine-readable storage medium stores one or more instruction that if executed by a machine cause the machine to performing any of the above first methods.

In one embodiment, an apparatus is configured or operable to perform any of the above first methods.

Embodiments include a first system including a processor and a dynamic random access memory (DRAM) coupled with the processor. The processor includes a plurality of cores and shared core extension logic coupled with each of the plurality of cores. The shared core extension logic has shared data processing logic that is shared by each of the plurality of cores. The processor also includes instruction execution logic, for each of the cores, that in response to a shared core extension call instruction, is to call the shared core extension logic. The call is to have data processing performed by the shared data processing logic, on behalf of a corresponding core.

Embodiments include the first system in which the shared core extension call instruction includes a macroinstruction of an instruction set of the cores.

Embodiments include any of the above first systems further including a plurality of architectural shared core extension command registers coupled with the instruction execution logic and the shared core extension logic, where the shared core extension call instruction is to indicate one of the shared core extension command registers and a plurality of parameters.

What is claimed is:

1. An apparatus comprising:

a plurality of cores;

a shared core extension logic coupled with each of the plurality of cores, the shared core extension logic having shared data processing logic that is to be shared by each of the plurality of cores at a given time; and instruction execution logic, for each of the cores, that in response to a shared core extension call instruction, is to call the shared core extension logic to have data processing performed by the shared data processing logic, on behalf of a corresponding core, wherein an instruction execution logic, for a given core of the plurality of cores, in response to the shared core extension call instruction which is to be provided from a given thread that is to be running on the given core, is to call the shared core extension logic to have the data processing performed by the shared data processing logic, while the given thread is to continue to run on the given core.

2. The apparatus of claim 1, wherein the shared core extension call instruction comprises a macroinstruction of an instruction set of the cores.

3. The apparatus of claim 1, further comprising a plurality of shared core extension command registers coupled with the instruction execution logic and the shared core extension logic, wherein the shared core extension call instruction is to indicate one of the shared core extension command registers and a plurality of parameters.

4. The apparatus of claim 3, wherein the instruction execution logic, in response to the shared core extension call instruction, is to store data in the indicated shared core extension command register based on the indicated parameters.

5. The apparatus of claim 4, wherein the instruction execution logic, in response to the shared core extension call instruction, is to store in the indicated shared core extension command register:

a pointer in a call attribute pointer field to point to call attribute information;

a pointer in an input data operand pointer field to point to an input data operand; and a pointer an output data operand pointer field to point to an output data operand.

6. The apparatus of claim 4, wherein the shared core extension logic is to store, based on data processing associated with the call, in the indicated shared core extension command register:

a status field to provide a status of the call; and a progress field to provide a progress of the call.

7. The apparatus of claim 1, wherein the shared data processing logic comprises at least one vector execution unit.

8. The apparatus of claim 1, wherein the shared data processing logic comprises data processing logic that is not found in the plurality of cores.

9. The apparatus of claim 1, wherein the instruction execution logic, in response to the shared core extension call instruction, is to call the shared core extension logic to have data processing performed on at least one input data structure in memory according to a routine to produce at least one output data structure in memory.

10. The apparatus of claim 1, further comprising:

a memory management unit (MMU) of a first core of the plurality;

a shared core extension MMU of the shared core extension logic; and a hardware interface between the MMU of the first core and the shared core extension MMU to exchange synchronization signals in hardware to synchronize the MMU of the first core and the shared core extension MMU.

11. The apparatus of claim 1, further comprising:

a memory management unit (MMU) of a first core of the plurality;

a shared core extension MMU of the shared core extension logic; and an interface between the MMU of the first core and the shared core extension MMU to route a page fault, which corresponds to a call from the first core, from the shared core extension MMU to the MMU of the first core.

12. The apparatus of claim 1, further comprising hardware scheduling logic on die with the shared core extension logic to schedule calls from the plurality of cores on the shared data processing logic.

13. A method comprising:

receiving, at a core of a processor having a plurality of cores, a shared core extension call instruction from a given thread that is running on the core, the shared core extension call instruction to cause the core to call a shared core extension logic, which is shared by the plurality of cores at a same time, to have data processing performed, the shared core extension call instruction indicating a shared core extension command register and indicating a plurality of parameters that specify the data processing to be performed; and calling the shared core extension logic, in response to the shared core extension call instruction, to have the data processing performed, while the given thread continues to run on the core, wherein calling the shared core extension logic includes storing data in the shared core extension command register indicated by the instruction based on the parameters indicated by the shared core extension call instruction.

14. The method of claim 13, wherein the shared core extension call instruction comprises a macroinstruction of an instruction set of the core, and wherein the shared core extension command register comprise an architectural register.

15. The method of claim 13, wherein storing the data in the indicated shared core extension command register based on the parameters comprises:

storing a pointer in a call attribute pointer field to point to call attribute information;

storing a pointer in an input data operand pointer field to point to an input data operand; and storing a pointer an output data operand pointer field to point to an output data operand.

16. The method of claim 13, further comprising, the shared core extension logic storing data in the indicated shared core extension register based on data processing associated with the call, the storing of the data including:

storing a status in a status field of the indicated register to provide a status of the call; and storing a progress in a progress field of the indicated register to provide a progress of the call.

17. The method of claim 13, wherein receiving the instruction comprises receiving a non-blocking shared core extension call instruction, and further comprising retiring the non-blocking shared core extension call instruction at the core after the shared core extension logic has accepted the data processing to be performed.

18. The method of claim 13, wherein receiving the instruction comprises receiving a blocking shared core extension call instruction, and further comprising retiring the blocking shared core extension call instruction at the core after the shared core extension logic has completed the data processing.

19. The method of claim 13, wherein receiving the instruction comprises receiving a blocking shared core extension call instruction, wherein the blocking shared core extension call instruction indicates a timeout value for a release of the indicated shared core extension command register.

20. The method of claim 13, wherein calling comprises calling the shared core extension logic to have data processing performed on at least one input data structure in memory according to a routine to produce at least one output data structure in memory.

21. The method of claim 13, further comprising synchronizing a memory management unit (MMU) of the core and a shared core extension MMU of the shared core extension logic by exchanging synchronization signals in hardware between the MMU and the shared core extension MMU.

22. The method of claim 13, further comprising routing a page fault corresponding to the call from a shared core extension memory management unit (MMU) to an MMU of the core.

23. The method of claim 13, further comprising, before receiving the shared core extension call instruction:

receiving a shared core extension abort instruction indicating the shared core extension command register; and stopping data processing corresponding to the shared core extension command register indicated by the shared core extension abort instruction, in response to the shared core extension abort instruction, and releasing the shared core extension command register.

24. The method of claim 13, further comprising, after receiving the shared core extension call instruction:

receiving a shared core extension read instruction indicating the shared core extension command register; and reading a data processing completion status from the shared core extension command register indicated by the shared core extension read instruction in response to the shared core extension read instruction.

25. A system comprising:

a processor comprising:

a plurality of cores;

a shared core extension logic coupled with each of the plurality of cores, the shared core extension logic having shared data processing logic that is to be shared by each of the plurality of cores at a given time; and instruction execution logic, for each of the cores, that in response to a shared core extension call instruction from a thread that is to be running on a corresponding core, is to call the shared core extension logic to have data processing performed by the shared data processing logic, on behalf of the corresponding core while the thread is to continue to run on the corresponding core; and a dynamic random access memory (DRAM) coupled with the processor.

26. The system of claim 25, wherein the shared core extension call instruction comprises a macroinstruction of an instruction set of the cores.

27. The system of claim 25, further comprising a plurality of architectural shared core extension command registers coupled with the instruction execution logic and the shared core extension logic, wherein the shared core extension call instruction is to indicate one of the shared core extension command registers and a plurality of parameters.

28. The apparatus of claim 1, further comprising a hardware interface to route operating system preemption and core exception conditions that trigger context switches between a core and the shared core extension logic.

29. An apparatus comprising:

a plurality of cores;

a shared core extension logic coupled with each of the plurality of cores, the shared core extension logic having shared data processing logic that is to be shared by each of the plurality of cores at a given time; and instruction execution logic, for each of the cores, that in response to a shared core extension call instruction, is to call the shared core extension logic to have data processing performed by the shared data processing logic, on behalf of a corresponding core, wherein each of the cores has a different design for flow control than the shared core extension logic.

30. An apparatus comprising:

a plurality of cores;

a shared core extension logic coupled with each of the plurality of cores, the shared core extension logic having shared data processing logic that is to be shared by each of the plurality of cores at a given time; and instruction execution logic, for each of the cores, that in response to a shared core extension call instruction, is to call the shared core extension logic to have data processing performed by the shared data processing logic, on behalf of a corresponding core, wherein each of the cores supports speculative execution and the shared core extension logic does not support speculative execution.

* * * * *